US 8,270,382 B2

(12) United States Patent
Cam-Winget et al.

(10) Patent No.: US 8,270,382 B2
(45) Date of Patent: *Sep. 18, 2012

(54) SYSTEM AND METHOD FOR SECURING MESH ACCESS POINTS IN A WIRELESS MESH NETWORK, INCLUDING RAPID ROAMING

(75) Inventors: Nancy Cam-Winget, Mountain View, CA (US); Shahriar I. Rahman, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,542

(22) Filed: Jul. 5, 2011

(65) Prior Publication Data

US 2011/0264915 A1    Oct. 27, 2011

Related U.S. Application Data

(63) Continuation of application No. 11/456,045, filed on Jul. 6, 2006, now Pat. No. 8,023,478.

(60) Provisional application No. 60/779,891, filed on Mar. 6, 2006.

(51) Int. Cl.
*H04W 40/00* (2009.01)

(52) U.S. Cl. .......................... 370/338; 713/171; 455/411

(58) Field of Classification Search .................. 370/252, 370/331, 338; 713/171, 168, 169; 455/41.1, 455/411, 435.1
See application file for complete search history.

(56) References Cited

U.S. PATENT DOCUMENTS

| | | | |
|---|---|---|---|
| 7,046,647 B2 | 5/2006 | Oba et al. | |
| 7,483,409 B2 * | 1/2009 | Zheng | 370/331 |
| 7,707,415 B2 | 4/2010 | Braskich et al. | |
| 7,804,807 B2 * | 9/2010 | Korus et al. | 370/338 |
| 7,814,322 B2 * | 10/2010 | Gurevich et al. | 713/171 |
| 2006/0013159 A2 | 1/2006 | Gurevich | |
| 2006/0133341 A1 * | 6/2006 | Chari et al. | 370/338 |
| 2006/0215582 A1 | 9/2006 | Castagnoli et al. | 370/328 |
| 2006/0253735 A1 * | 11/2006 | Kwak et al. | 714/12 |
| 2007/0121947 A1 * | 5/2007 | Sood et al. | 380/277 |
| 2007/0153739 A1 | 7/2007 | Zheng | |
| 2007/0160017 A1 * | 7/2007 | Meier et al. | 370/338 |
| 2007/0189247 A1 * | 8/2007 | Wang et al. | 370/338 |
| 2007/0189249 A1 * | 8/2007 | Gurevich et al. | 370/338 |
| 2007/0250713 A1 | 10/2007 | Rahman et al. | |
| 2008/0031155 A1 | 2/2008 | Korus et al. | |

(Continued)

OTHER PUBLICATIONS

IEEE Std 802.11i-2004, IEEE, New York, NY. Available online at www.IEEE.org.

(Continued)

*Primary Examiner* — Kamran Afshar
*Assistant Examiner* — Khawar Iqbal
(74) *Attorney, Agent, or Firm* — Dov Rosenfeld; INVENTEK

(57) ABSTRACT

Authentication in a mesh network controlled by a central controller, including using standard IEEE 802.11i mechanisms between a potential child mesh access point (AP) as supplicant and the controller as authenticator. Each mesh AP in the mesh network has a secure tunnel to a controller using a protocol for controlling the mesh AP, including AP capabilities, and a fast roaming method for re-establishing a secure layer-2 link with a new parent mesh AP including, while the mesh AP is a child mesh AP to the first parent mesh AP and has a secure layer-2 link to the first parent mesh AP, caching key information and wireless mesh network identity information in the controller.

23 Claims, 20 Drawing Sheets

U.S. PATENT DOCUMENTS

| | | | |
|---|---|---|---|
| 2008/0069105 | A1 | 3/2008 | Costa et al. |
| 2008/0069348 | A1 | 3/2008 | Walker et al. |
| 2008/0112363 | A1* | 5/2008 | Rahman et al. ............... 370/331 |
| 2009/0217033 | A1* | 8/2009 | Costa et al. .................... 713/155 |
| 2009/0323631 | A1* | 12/2009 | Bajic ............................. 370/331 |
| 2011/0090834 | A1* | 4/2011 | Hares et al. ................... 370/312 |

OTHER PUBLICATIONS

IEEE P802.11r/D1.0, Draft Amendment to IEEE Std 802.11-2005, IEEE, New York, NY.

IEEE Std 802.1X-2004, IEEE, New York, NY. Available online at www.IEEE.org.

Neal Castagnoli, "How AWPP will make mesh networks easier to deploy," Parts 1 and 2, by, in Wireless Net Design Line, Dec. 5, 2005, CMP Media LLC, 600 Community Drive, Manhasset, NY 11030, downloadable (Mar. 4, 2006) as www.wirelessnetdesignline.com/howto/174900638 and www.wirelessnetdesignline.com/howto/174900407 at www.wirelessnetdesignline.com.

T. Charles Clancy, "Security Review of the Lightweight Access Point Protocol", Department of Computer Science, University of Maryland, College Park, MD, May 2005. Available for download at http://www.cs.umd.edu/~clancy/docs/lwapp-review.pdf on May 25, 2006.

Cam-Winget, D. McGrew, J. Salowey and H. Zhou, The Flexible Authentication via Secure Tunneling Extensible Authentication Protocol Method (EAP-FAST), draft-cam-winget-eap-fast-03.txt, Network Working Group Draft, Oct. 19, 2005. Available online at http://www.ietf.org/internet-drafts/draft-cam-winget-eap-fast-03.txt.

T. Dierks and E. Rescorla, "The TLS Protocol Version 1.2," Internet Draft, <draft-ietf-tls-rfc4346-bis-00.txt>, Feb. 2006. Available online at http://www3.ietf.org/proceedings/06mar/IDs/draft-ietf-tls-rfc4346-bis-00.txt.

P. Calhoun, B. O'Hara, R. Suri, N. Cam-Winget, S. Kelly, M. Williams and S. Hares, Light Weight Access Point Protocol, Network Working Group, <draft-ohara-capwap-lwapp-03.txt>, Internet draft, Jun. 24, 2005. Available online at http://www3.ietf.org/proceedings/05nov/IDs/draft-ohara-capwap-lwapp-03.txt.

Z. Cheng, M. Nistazakis and R. Comley, "Security Analysis of LWAPP", 2nd International Workshop on Wireless Security Technologies IWWST-2004, London, UK, Apr. 2004. Available for download at www.cs.mdx.Ac.uk/staffpages/m_cheng/link/lwapp_g.pdf on May 25, 2006.

T. Dierks and C. Allen, "The TLS Protocol Version 1.0," Network Working Group, Standards Track, Jan. 1999. Available online at http://www.ietf.org/rfc/rfc2246.txt.

S. Blake-Wilson, M. Nystrom, D. Hopwood, J. Mikkelsen and T. Wright, "Transport Layer Security (TLS) Extensions", Network Working Group, Standards Track, Jun. 2003. Available online at http://www.ietf.org/rfc/rfc3546.txt.

PCT International Preliminary Report on Patentability on PCT Application PCT/US2007/062740.

Castagnoli, "How AWPP will make mesh networks easier to deploy", Retrieved from Wireless Net Designline, <URL: http://www.wirelessnetdesignline.com/howto/174900407>, on Dec. 5, 2005.

Clancy, "Security Review of the Light-Weight Access-Point Protocol", Retrieved from University of Maryland, <URL: http://www.cs-umd.edu/~clancy/docs/lwapp-review.pdf>, on May 12, 2005.

Cheng et al, "Security Analysis of LWAPP", Retrieved from Universidad Jesuita de Guadalajara, <URL: kino.iteso.mx/~ivan/redes/ap/bibliografia/lwapp_g.pdf>, on Apr. 7, 2004.

Cam-Winget et al, "The Flexible Authentication via Secure Tunneling Extensible Authentication Protocol Method (EAP-FAST)", draft-cam-winget-eap-fast-03.txt, Retrieved from the Internet Engineering Task Force (IETF), <URL: http://tools.ietf.org/html/draft-cam-winget-eap-fast-03, Oct. 19, 2005.

Search report for related PCT Application, No. PCT/US07/62740, mailed on Feb. 20, 2008.

Sue Hares and Albert Lew, "Securing An 802.11 Network" *Wireless Net DesignLine*, Jun. 27, 2006, retrieved on Apr. 9, 2007 at http://www.wirelessnetdesignline.com/showArticle.jhtml?articleID=189602104.

W. S.Conner, J. Kruys, K. Kim, J. C. Zuniga, "IEEE 802.11s Tutorial," presented at IEEE 802 Plenary, Dallas, TX, Monday, Nov. 13, 2006. Retrieved on Apr. 9, 2007 at ww.ieee802.org/802_tutorials/nov06/802.11s_Tutorial_r5.pdf.

* cited by examiner

| ADJ_HDR (16B) | ADJ_UPD_HDR (12B) | MSNIE (22B) | RSNIE (24B) |

NEIGH_UPD

FIG. 14

| CHANNEL (1B) | ANTENNA (1B) | SNR (1B) | FLAGS (1B) | PARENT_MAC (6B) | DST_MAC (6B) |

ADJ_HDR

FIG. 15

| TYPE (1B) | SNR (1B) | ERROR (1B) | NUM_ROUTES (1B) | ANTENNA (1B) | CHANNEL (1B) |
| CHILD_ADDR (6B) | NET_NAME (12B) |

ADJ_UPD_HDR

FIG. 16

| TYPE (1B) | LENGTH (1B) | VERSION (2B) | MDID (12B) | Network access server ID (6B) |

MSNIE

FIG. 17

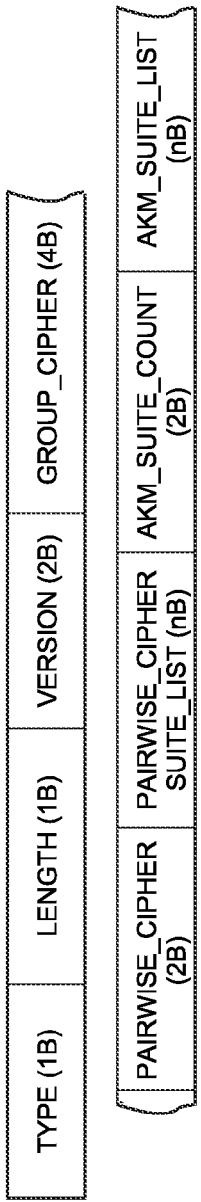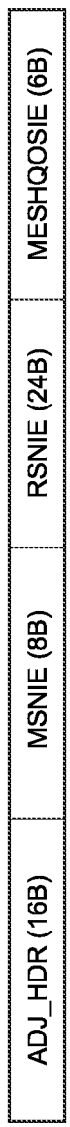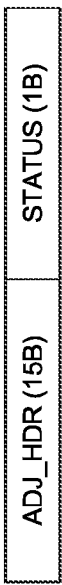
FIG. 18
FIG. 19
FIG. 20
FIG. 21

LWAPP_MESH_REQ → | LWAPP_HDR (6B) | LWAPP_CNTRL_HDR (8B) | MESH_REQ_PAYLOAD (36B) |

FIG. 22

LWAPP_HDR → | VER-RID-FLGS (1B) | FRAG ID (1B) | LENGTH (2B) | STATUS/WLANS (2B) |

FIG. 23

LWAPP_CNTRL_HDR → | MSG_TYPE (1B) | SEQ_NUM (1B) | LENGTH (2B) | SESSION_ID (4B) |

FIG. 24

MESH_REQ_PAYLOAD → | TYPE (1B) | LENGTH (2B) | FLAGS (1B) | QOS CAPABILITIES (2B) | SUPP_MAC (6B) |
| MSNIE (22B) | RSNIE (24B) |

FIG. 25

LWAPP_MESH_RSP → | LWAPP_HDR (6B) | LWAPP_CNTRL_HDR (8B) | MESH_RSP_PAYLOAD (10B) |

FIG. 26

FIG. 27 MESH_RSP_PAYLOAD: TYPE (1B) | LENGTH (2B) | FLAGS (1B) | SUPP_MAC (6B)

FIG. 28 LWAPP_MESH_KEY: LWAPP_HDR (6B) | LWAPP_CNTRL_HDR (8B) | MESH_KEY_PAYLOAD (55B)

FIG. 29 MESH_KEY_PAYLOAD: TYPE (1B) | LENGTH (2B) | SUPP_MAC (6B) | RSNIE (24B) | FLAGS (1B) | RADIO_ID (1B) | QOS_CAPABILITES (2B) | ASSOC_ID (2B) | PTK (4B) | PTK_LIFETIME (4B) | RCV_SEQ_CTR (4B) | XMT_SEQ_CTR (4B)

FIG. 30 LWAPP_DISCOVERY_REQ: LWAPP_HDR (6B) | LWAPP_CNTRL_HDR (8B) | DISCOVERY ELEMENTS (nB) | MESH_DISC_PAYLOAD (7B)

| TYPE (1B) | LENGTH (2B) | CAPABILITIES (2B) |

FIG. 31

MESH_DISC_PAYLOAD

| LWAPP_HDR (6B) | LWAPP_CNTRL_HDR (8B) | JOIN_RSP ELEMENTS (nB) | MESH_JOIN_PAYLOAD (27B) |

FIG. 32

LWAPP_JOIN_RSP

| TYPE (1B) | LENGTH (2B) | RKEYID (4B) | RKEY (4) | RKEY_LIFETIME (4B) | LKEY (4B) | LKEY_LIFETIME (4B) |

FIG. 33

MESH_JOIN_PAYLOAD

| ADJ_HDR (16B) | SNONCE (32B) | MDID (12B) | RKEYID (4B) or PMKR0Name(16B) |

FIG. 34

TGR_AUTH_REQ

FIG. 35 — TGR_AUTH_RSP: ADJ_HDR (16B) | ANONCE (32B) | SNONCE (32B) | RKEYID (4B) or PMKR0Name (16B)
FIG. 36 — LWAPP_MESH_RREQ: LWAPP_HDR (6B) | LWAPP_CNTRL_HDR (8B) | MESH_RREQ_PAYLOAD (87B)
FIG. 37 — MESH_RREQ_PAYLOAD: TYPE (1B) | LENGTH (2B) | SNONCE (32B) | ANONCE (32B) | RKEYID (4B) or PMKR0Name (16B) | MDID (12B)
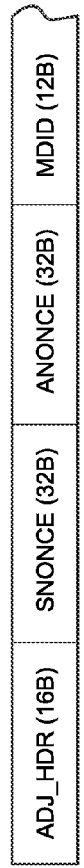
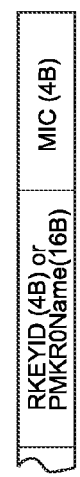
FIG. 38 — MESH_RE-ASSOC_REQ: ADJ_HDR (16B) | SNONCE (32B) | ANONCE (32B) | MDID (12B) | RKEYID (4B) or PMKR0Name (16B) | MIC (4B)

FIG. 39 MESH_RE-ASSOC_RSP: ADJ_HDR (16B) | ANONCE (32B) | MDID (12B) | RKEYID (4B) or PMKR1Name(16B) | MIC (8B)

FIG. 40 LWAPP_JOIN_ROAM_REQ: LWAPP_HDR (6B) | LWAPP_CNTRL_HDR (8B) | JOIN_REQ_ELEMENTS (nB) | MESH_RREQ_PAYLOAD (87B)

FIG. 41 LWAPP_JOIN_ROAM_RSP: LWAPP_HDR (6B) | LWAPP_CNTRL_HDR (8B) | JOIN_RSP_ELEMENTS (nB) | MESH_RREQ_PAYLOAD (87B) | MESH_RRSP_PAYLOAD (23B)

FIG. 42 MESH_RRSP_PAYLOAD: TYPE (1B) | LENGTH (2B) | RKEYID (4B) | LKEY2 (4B) | LKEY2_LIFETIME (4B) | RKEY (256B) | RKEY_LIFETIME (4B)

SYSTEM AND METHOD FOR SECURING MESH ACCESS POINTS IN A WIRELESS MESH NETWORK, INCLUDING RAPID ROAMING

RELATED PATENT APPLICATIONS

The present disclosure is a continuation of U.S. patent application Ser. No. 11/456,045 filed Jul. 6, 2006 now U.S. Pat. No. 8,023,478 to inventors Cam-Winget et al., the contents of which are incorporated herein by reference. U.S. patent application Ser. No. 11/456,045 claims benefit of priority to U.S. Provisional Patent Application Ser. No. 60/779,891 to inventors Cam Winget et al., filed Mar. 6, 2006, the contents of which are incorporated herein by reference.

BACKGROUND

The present invention relates to wireless networks, and in particular, to a system and method for enabling secure and rapid roaming of mesh access points in a wireless mesh network.

Wireless Mesh Networks and the Need for Secure and Rapid Roaming

Wireless mesh networks have recently become popular. In particular, wireless mesh networks that operate under one of the IEEE 802.11 wireless local area network (WLAN) standards have recently become popular. An exemplary wireless mesh network is illustrated in FIG. 6, which shows wireless access points (APs) 603, 605, 607, and 609, e.g., used outdoors. The access points 603, 605, 607, and 609 also each act as mesh points of a wireless mesh network, e.g., using an additional radio transceiver for the mesh backbone connection to route traffic between the mesh points, called mesh APs 603, 605, 607, and 609, to that used for the AP functionality. Such mesh access points may be used, for example, to cover large metropolitan areas. The exemplary system uses the IEEE 802.11a standard for backhaul data transmission between the mesh points, and uses the IEEE 802.11b/g standard for client access. One client 611 of mesh AP 605 is shown. Also shown is an AP, e.g., an indoor AP 613 that connects via the 2.4 GHz link to mesh AP 607.

As shown in FIG. 6, the exemplary wireless mesh network 600 includes of two types of mesh points: a root access point (root AP, RAP) 603, shown here on the roof of a building, and a mesh access point (mesh AP, MAP) 605, 607, and 609 each shown here on a pole-top. Each of these also acts as an access point. A mesh point without the AP capability is simply called a mesh point, and in this description, mesh APs can act as mesh points when there are no client stations, or if the wireless AP capabilities are disabled.

Recently, there has been a move in wireless networks away from autonomous access points towards what are called "light-weight" access points that are centrally controlled by, and work together with an entity in the wired network called an "WLAN Controller" (WLC), or simply a Controller. The general goal has been to move most of the traditional wireless functionality such as access control (user authentication and authorization), mobility and radio management out of the access point into a centralized Controller. The operation of the access point is managed by messages between the WLAN Controller and the AP using a protocol called the Lightweight AP Protocol (LWAPP). See for example, "Lightweight Access Point Protocol," Draft, IETF Working Group on Control And Provisioning of Wireless Access Points (capwap), available for download on Mar. 3, 2006 from URL <www3.ietf.org/proceedings/05nov/IDs/draft-ohara-capwap-lwapp-03.txt> and elsewhere. In that document, the lightweight AP is referred to as a wireless termination point (WTP). Those in the art will be familiar with the Lightweight Access Point Protocol, (LWAPP) as described in the above cited and readily available "capwap" IETF draft.

In the examples used herein, the access points 603, 605, 607, and 609 of FIG. 6 are assumed to be lightweight APs operating with a WLAN Controller 615 coupled to the root AP 603 by a network, shown here as a wired wide area network (WAN) 617. The Controller uses LWAPP to communicate with the mesh APs. For operation as an access point, a lightweight access point requires a link to a WLAN Controller such as Controller 615.

It is known to include security in LWAPP. Mesh security includes link-level security ("IEEE 802.11" security, "layer-2" security) for communication between a child mesh AP and a parent mesh AP, and tunnel security ("LWAPP tunnel" security, for communication between a child mesh AP and the Controller 615 via a secure tunnel established using LWAPP. See the above referenced capwap IETF draft. The secure tunnel provided for securely communication between an AP, e.g., a mesh AP and the Controller so that data from any client associated with the AP can securely communicate with the Controller.

There is a need in the art for new methods of securing a mesh network. There further is a need in the art for a method and mechanisms for a child mesh AP of a mesh to rapidly roam from one parent to another.

Note that the need for rapid roaming in wireless networks has long been recognized. For example, the IEEE 802.11 WLAN standards committee has formed a task group (Task Group "r", so called TG-r) to establish a new standard, to be known as the IEEE 802.11r standard for rapid roaming within an IEEE basis service set. The rapid roaming methods being considered by TG-r deal with layer-2 aspects of client roaming. However, there still is a need for rapid mesh roaming to re-establish a secure LWAPP tunnel from a child mesh AP to the Controller. For example, the authorization, e.g. access control may change as a client moves from one AP to the other. Also, the accounting server needs to be appraised of the change that can happen at the time the controller tunnel is "re-established."

Thus, there is a need in the art for extending the roaming capabilities provided by the current TG-r proposal to enable rapid roaming of mesh points, such as mesh APs, including rapidly re-establishing a secure LWAPP tunnel between a child mesh AP and a Controller.

GLOSSARY OF TERMS: SOME ACRONYMS AND DEFINITIONS

Those in the art working in this field can be assumed to be familiar with the IEEE 802.1x standard: Port-based Network Access Control, IEEE-Std-802.1x-2004, the IEEE 802.11i standard: Amendment 6: MAC Security Enhancements, IEEE-Std IEEE 802.11i-2004; and the TLS Standard, IETF RFC 2246, available at, and downloaded at <http://www.ietf.org/rfc/rfc2246.txt> on Mar. 3, 2006.

The following are some of the terms used herein:

| | |
|---|---|
| WLC | the WLAN Controller, or simply Controller that centrally controls aspects of operation of an access point (AP), including, in one embodiment, the mesh network control, including mesh security aspects. |
| AES | Advanced Encryption Standard. |
| AS | Authentication Server. |
| AWPP | Adaptive Wireless Path Protocol, a mesh routing protocol as described in U.S. Patent Ser. No. Application 11/213,287 filed Aug. 26, 2005 to Castagnoli, et al., and titled "AUTOMATIC ROUTE CONFIGURATION IN HIERARCHICAL WIRELESS MESH NETWORKS," assigned to the assignee of the present invention. The contents of U.S. Patent Ser. No. Application 11/213,287 are incorporated herein by reference. |
| BMK | Bridge Master Key. |
| CMAP | Child Mesh AP. |
| EAP | Extensible Authentication Protocol, e.g., the protocol in IEEE 802.1x. |
| EAP-FAST | a publicly accessible IEEE 802.1X EAP type developed by Cisco Systems, Inc., related to the assignee of the present invention, and available as an IETF informational draft filename "draft-cam-winget-eap-fast-03.txt," incorporated herein by reference. |
| GTK | Group Transient Key. |
| KDE | Key Data Encapsulation. A KDE is a key data information element that is encapsulated in key frames, such as GTK(s), station Key(s), or PMK ID(s). See Section 8.5.2 "EAPOL-Key frames" of the IEEE 802.11i standard. |
| Layer-2 security | This is the layer-2 IEEE 802.11 link between a child mesh AP and its immediate parent. |
| LKEY | LWAPP Key used for secure LWAPP communication between a mesh AP and the Controller. |
| LWAPP | Lightweight Access Point Protocol. See for example, "Lightweight Access Point Protocol," Draft, IETF Working Group on Control And Provisioning of Wireless Access Points (capwap), available for download on Mar. 3, 2006 from URL <www3.ietf.org/proceedings/05nov/IDs/draft-ohara-capwap-lwapp-03.txt> and elsewhere. |
| LWAPP tunnel | We say an LWAPP tunnel exists when there is secure communication established under LWAPP between a mesh AP and a Controller. A prerequisite for the existence of a secure LWAPP tunnel between a particular mesh AP and the Controller is that there are layer-2 secure links (also called IEEE 802.11 secure links, and link-level security) between each child mesh AP and its immediate parent on the path from the particular mesh AP to the Controller. |
| MC | Mesh Controller, a central entity that controls the wireless mesh network, using LWAPP. In the description herein, the Mesh Controller is the Controller that includes the functionality of a WLAN Controller and that controls each lightweight AP that is part of the mesh. |
| MIC | Message integrity check. |
| MP | Mesh point, a wireless node of a loop free tree structure that forms the mesh network. |
| MDID | Mesh Domain ID, an identifier for the mesh domain. |
| MAP | Mesh AP, a wireless mesh node that includes an additional radio and acts as an AP for wireless clients that can associate with the mesh AP. |
| MIB | Management Information Base. |
| MSNIE | Mesh Security Network information element (IE). |
| NAC | Network Access Control. |
| NAS | Network access server. |
| NONCE | A ransom number generated by one peer that provides for generating a key, e.g., by a receiving peer. |
| NASID | Network access server identifier. |
| PMAP | Parent Mesh AP. |
| PMK | Pairwise Master Key. |
| PSK | Pre-shared Master Key. All mesh APs are set in the factory to know the PSK. |
| PTK | Pairwise Transient Key. |
| RAP | Root AP. |
| RADIUS | Remote Authentication Dial-In User Service. |
| RSN | Robust Security Network (RSN), an element in 802.11i that dynamically negotiates the authentication and encryption algorithms to be used for communications with wireless clients. RSN uses the Advanced Encryption Standard (AES), along with 802.1x and EAP. |
| RSNIE | Robust Security Network information element (IE). |
| TLS | Transport Layer Security. |
| WPA | Wireless Protected Access. |
| WTP | Wireless termination point, a lightweight access point. |

SUMMARY

Described herein are methods, mechanisms for one or more state machine(s), and computer programs, e.g., instructions that when executed by one or more processors of a processing system carry out one or more of the methods. The methods provide for establishing child-to-parent link-level security and mesh AP-to-Controller LWAPP tunnel security applicable to wireless mesh networks.

One aspect of the invention is an authentication method that uses standard IEEE 802.11i mechanisms for authenticating a wireless station to become a child mesh AP to a parent mesh AP that has a secure tunnel to a Controller.

Another aspect of the present invention include a fast roaming mechanism to be applicable for mesh APs in a Controller-based environment for re-establishing a secure layer-2 link without having to undergo a 4-way authentication.

Another aspect of the invention provides for rapidly re-establishing a secure tunnel to a Controller when a mesh point that was the child mesh AP of a first parent mesh AP roams to become the child mesh AP of a second parent mesh AP that has a secure tunnel to the Controller.

These aspects improve convergence of roaming/mobile mesh APs. Thus, for example, such mesh APs may be put in a vehicular environment in the future.

Thus, the present-day LWAPP "join" is adapted to include the IEEE 802.11r protocol and an LWAPP session roaming protocol. These methods may be incorporated into existing LWAPP mesh security protocol infrastructure without making significant changes to existing protocols or infrastructure.

According to one or more aspects, advantages and features of the invention can include one or more of:

1) Leveraging 802.11r draft mechanisms and adapting these to apply to mesh networks, in particular, to a mesh environment that uses lightweight mesh APs and a Controller without significantly changing the mesh routing/forwarding infrastructure.

2) Leveraging session resumption mechanisms such as TLS session resumption mechanisms and adapting such mechanisms to an LWAPP base state machine with insignificant changes to the state machine to enable efficient inter and intra Controller transitions of a child mesh AP.

3) Providing for fast re-authentication on top of an authentication process that' substantially conforms to a standard process such as 802.1x/802.11i-based authentication. 802.1x/802.11i-based authentication is proven and tried-and-true.

4) Improving both link-level and LWAPP tunnel re-establishment upon roaming, without needing to undergo a LWAPP re-discovery cycle.

One aspect of the invention is method in a first mesh AP in a wireless mesh network. The wireless mesh network includes a second mesh AP that has a secure tunnel to a Controller. Each mesh AP of the wireless mesh network is a lightweight AP having AP functionality controlled by the Controller. One of the mesh APs of the wireless mesh network is a root AP in the wireless mesh network.

The method includes sending a mesh-specific association request frame to the second mesh AP indicating that the first mesh AP would like to join the mesh network with the second mesh AP as its parent mesh AP.

The method further includes receiving a mesh-specific association response frame from the second mesh AP indicating that the Controller will accept the first mesh AP to the mesh network. The response is as a result of the second mesh AP receiving the association request frame and acting as a pass-through to send information to the Controller about the first mesh AP's request to secure the layer-2 link between the first mesh AP and the second mesh AP, the Controller receiving the information about the first mesh AP and ascertaining that the Controller will allow the first mesh AP to secure a layer-2 link with the second mesh AP as its parent mesh AP, and the Controller sending a response frame to the second mesh AP indicating that the Controller will accept the first mesh AP to the mesh network, and as a result of the second mesh AP sending the mesh-specific association response frame to the first mesh AP.

The method further includes undergoing a certificate-based authentication with an authenticator including a first 4-way handshake with the authenticator, the certificate-based authentication resulting in a first pairwise master key available at the first mesh AP and the authenticator. The method further includes undergoing a second 4-way handshake with the authenticator using the first pairwise master key to determine a first pairwise transient key to use between the first mesh AP and the second mesh AP. The certificate-based first 4-way handshake and the second 4-way handshake substantially conform to a standard wireless network authentication process, such as an 802.11i process.

The method further includes sending a join request and carrying out a join exchange with the Controller by securely communicating to the Controller via the second mesh AP, such that a secure tunnel is formed between the first mesh AP and the Controller. The methos is arranged such that the use of a certificate based authentication provides a secure mechanism for establishing a fresh key for every session compared to using a pre-shared master key or a bridge master key.

In one embodiment, the authenticator is the Controller.

In one embodiment, after the secure tunnel is established between the Controller and the first mesh AP, all wireless client data frames from the first mesh AP are passed through to the Controller. Furthermore, in one embodiment, no wireless client data frames are passed through to the Controller until the secure tunnel is established between the Controller and the first mesh AP. control frames needed for the join exchange are passed through to the Controller before the secure tunnel is established between the Controller and the first mesh AP.

One embodiment further includes receiving a mesh beacon frame sent by the second mesh AP advertising the second mesh AP's capabilities as a parent, the advertising frame including information related to how to associate with the mesh network, and information about the mesh network's security profile, and ascertaining based on information related to the receiving of the mesh beacon frame, that the first mesh AP is to attempt joining the mesh network via the second mesh AP. A version further includes caching key context information, including a roam key and an identifier therefor, and caching mesh domain identification information, such that a secure layer-2 link can be rapidly established between the first mesh AP and a third mesh AP that has a secure link with the Controller, wherein the third mesh AP sends mesh beacon frames that include an indication that the third mesh AP supports fast roaming of links between a child mesh AP and the third mesh AP as a parent mesh AP, the indication sufficient to ascertain if fast roaming is possible to the third mesh AP.

A version further includes, after the secure tunnel is formed between the first mesh AP and the Controller, caching the session identifier for the secure tunnel with the Controller, the key for the secure tunnel, the roam key and the identity of the Controller, such that a secure tunnel with the Controller can be rapidly re-established via a third mesh AP that has a secure link with the Controller, the re-establishing not requiring a complete discover exchange between the first mesh AP and the Controller via the third mesh AP, the re-establishing further not requiring a complete join exchange between the first mesh AP and the Controller via the third mesh AP. In one implementation, the third mesh AP sends mesh beacon frames that include an indication that the third mesh AP supports fast roaming of secure tunnels.

Another aspect is a method in a wireless mesh network of authenticating a mesh AP that is a child mesh AP of a first parent mesh AP to become the child mesh AP of a second parent mesh AP, the first and second parent mesh APs being in the wireless mesh network and being lightweight access points each having a secure tunnel with a Controller. The child mesh AP also is a lightweight access point that when the child mesh AP was the child of the first parent mesh AP, had a secure tunnel with the Controller. The method is in the child mesh AP, and includes: when the child mesh AP was the child of the first parent mesh AP, caching key context information that includes a roam key and an identifier therefor, and caching identification information on the mesh network, such that a secure link can be rapidly established between the child mesh AP and a any mesh AP that can be a parent mesh AP and that has a secure tunnel with the Controller, the Controller also caching the roam key.

The method further includes receiving a mesh beacon frame sent by the second parent mesh AP to advertise the second parent mesh AP's capabilities as a parent mesh AP, including an indication that the second mesh AP supports fast roaming, and ascertaining based on information related to the receiving of the mesh beacon frame, and the contents of the beacon frame, that the child mesh AP is to attempt joining the mesh network via the second mesh AP.

The method further includes sending a re-authentication request frame to the second parent mesh AP, the re-authentication request frame including child information useful for forming a pairwise transient key to use for the child mesh AP to communicate with the second parent mesh AP, the re-authentication request frame further including information on the roam key to indicate to the second parent mesh AP that the child mesh AP is already in session with the Controller. The sending of the re-authentication request frame is such that that the second mesh AP can pass-through information to the Controller about the child AP to validate the child mesh AP re-joining the mesh network via the second parent mesh AP, including information on the roam key, such that there is sufficient information for a transient pairwise key to be available at the Controller or the second mesh AP for use for the child mesh AP securely communicating with the second mesh AP.

The method further includes receiving a re-authentication response frame from the second mesh AP, the re-authentication response frame including parent information for encryption, such that the child mesh AP can generate the pairwise transient key for communicating with the second parent mesh AP, the receiving of the re-authentication response frame as a result of the second parent mesh AP receiving the re-authentication request frame and sending the re-authentication response frame.

The method further includes sending a mesh re-association request to the second mesh AP indicating that the first mesh AP would like to establish a secure layer-2 link with the second parent mesh AP to join the mesh network with the second mesh AP as its parent mesh AP, the re-association request frame including identification information on the mesh network the child mesh AP was associated with, and a message integrity check to provide proof of identity to a receiving parent mesh AP.

The method also includes receiving a re-association response frame from the second mesh AP indicating, in the case that the Controller has validated accepting the child mesh AP via the second mesh AP, an indication that the Controller will accept the child mesh AP to the mesh network, the response as a result of a validation process that includes: the second mesh AP sending the information to the Controller about the child AP; the Controller receiving the information about the child mesh AP and ascertaining whether Controller will accept the child mesh AP as a child of the second mesh AP; in the case that the Controller ascertains to accept the child mesh AP, the Controller sending an indication that the Controller will accept the child mesh AP to the mesh network and either the Controller determining the pairwise transient key and sending the pairwise transient key to the second mesh AP, or the second parent mesh AP having the pairwise transient key; the second mesh AP receiving the re-association request frame; and the second mesh AP confirming the re-association request frame, and after affirmative confirmation and after receiving or having the pairwise transient key, sending the re-association response frame to the child mesh AP.

The method is such that both the child mesh AP and the second parent mesh AP have a pairwise transient key for a secure layer-2 link established from the child mesh AP to the second parent mesh AP without requiring either a full backend authentication or a 4-way handshake.

Another aspect is a method in a mesh AP of a wireless mesh network that had a layer-2 secure link to and was a child mesh AP of a first parent mesh AP at a time when the first parent mesh AP had a secure tunnel established with a Controller. As above, each mesh AP is a lightweight AP controlled by the Controller using frames conforming to a control protocol, the controlling including establishing security. The method includes establishing a secure layer-2 link to a second parent mesh AP, the second parent mesh AP having a secure tunnel with the Controller; and establishing a secure tunnel to the Controller via the second parent mesh AP.

In one embodiment, the establishing of the secure layer-2 link from the child mesh AP to the second parent mesh AP is a fast layer-2 roam without requiring either a full backend authentication or a 4-way handshake with the second parent mesh AP.

In one embodiment, the establishing of the secure tunnel to the Controller uses the first session identifier from the secure tunnel and does not need a complete discovery exchange with the Controller or a complete join exchange with the Controller.

Another aspect of the invention is A method in a mesh AP of a wireless mesh network, the mesh AP having had a secure tunnel to a Controller via a first parent mesh AP, the method being of re-establishing a secure tunnel to the Controller via a second mesh AP, the method comprising: caching session information about a first session when it has a secure tunnel to the Controller via the first parent mesh AP, establishing a secure-layer-2 link to a second parent mesh AP; and having a re-join exchange with the Controller via the second mesh AP and using the cached session information and information cached at the Controller on the first session to re-establish a secure tunnel with the Controller, the re-establish secure tunnel being via the second parent mesh AP. The method is such that the re-establishing does not require a complete discovery exchange with the Controller or a complete join exchange with the Controller.

Other aspects of the invention are each a computer readable storage medium configured with instructions that when executed by one or more processors of a processing system in a first mesh AP in a wireless mesh network, cause the processor(s) to implement any one of the methods described above in this SUMMARY section.

Another aspect of the invention is An apparatus in a first mesh AP in a wireless mesh network. The wireless mesh network includes a second mesh AP that has a secure tunnel to a Controller. Each mesh AP of the wireless mesh network is a lightweight mesh AP that has AP and mesh functionality controlled by the Controller, one of the mesh APs of the wireless mesh network being a root AP in the wireless mesh network.

The apparatus includes means for sending a mesh-specific association request frame to the second mesh AP indicating that the first mesh AP would like to join the mesh network with the second mesh AP as its parent mesh AP.

The apparatus further includes means for receiving a mesh-specific association response frame from the second mesh AP indicating that the Controller will accept the first mesh AP to the mesh network, the response as a result of the second mesh AP receiving the association request frame and acting as a pass-through to send information to the Controller about the first mesh AP's request to secure the layer-2 link between the first mesh AP and the second mesh AP, the Controller receiving the information about the first mesh AP and ascertaining that the Controller will allow the first mesh AP to secure a layer-2 link with the second mesh AP as its parent mesh AP, and the Controller sending a response frame to the second mesh AP indicating that the Controller will accept the first mesh AP to the mesh network, and as a result of the second mesh AP sending the mesh-specific association response frame to the first mesh AP.

The apparatus further includes means for undergoing an authentication process that substantially conforms to a standard wireless network authentication process, the authentication including a certificate-based authentication with an authenticator including a first 4-way handshake with the authenticator, the certificate-based authentication resulting in a first pairwise master key available at the first mesh AP and the authenticator, the substantially conforming authentication process further including a second 4-way handshake with the authenticator using the first pairwise master key to determine a first pairwise transient key to use between the first mesh AP and the second mesh AP.

The apparatus further includes means for sending a join request and carrying out a join exchange with the Controller by securely communicating to the Controller via the second mesh AP, such that a secure tunnel is formed between the first mesh AP and the Controller. These means are arranged in combination such that the use of a certificate based authentication provides a secure mechanism for establishing a fresh key for every session compared to using a pre-shared master key or a bridge master key.

Other aspects, features, and advantages will be clear from the description herein.

DESCRIPTION OF THE DRAWINGS

FIG. 2 also shows the elements of Controller 615 that includes aspects of the present invention.

FIGS. 14-33 depict and describe frames or frame parts used in one embodiment for aspects of authentication in a wireless mesh network.

FIGS. 34-42 show frames or frame parts used in one embodiment to provide some re-authentication aspects of the present invention.

DETAILED DESCRIPTION

A method and mechanisms are described to establish both the link layer wireless security in a wireless mesh network, e.g., an IEEE 802.11 conforming network, as well as a LWAPP secure session, that is, a secure LWAPP tunnel between a Controller and a mesh AP that is a lightweight AP.

An Overview of Mesh Networks

Figure 6:
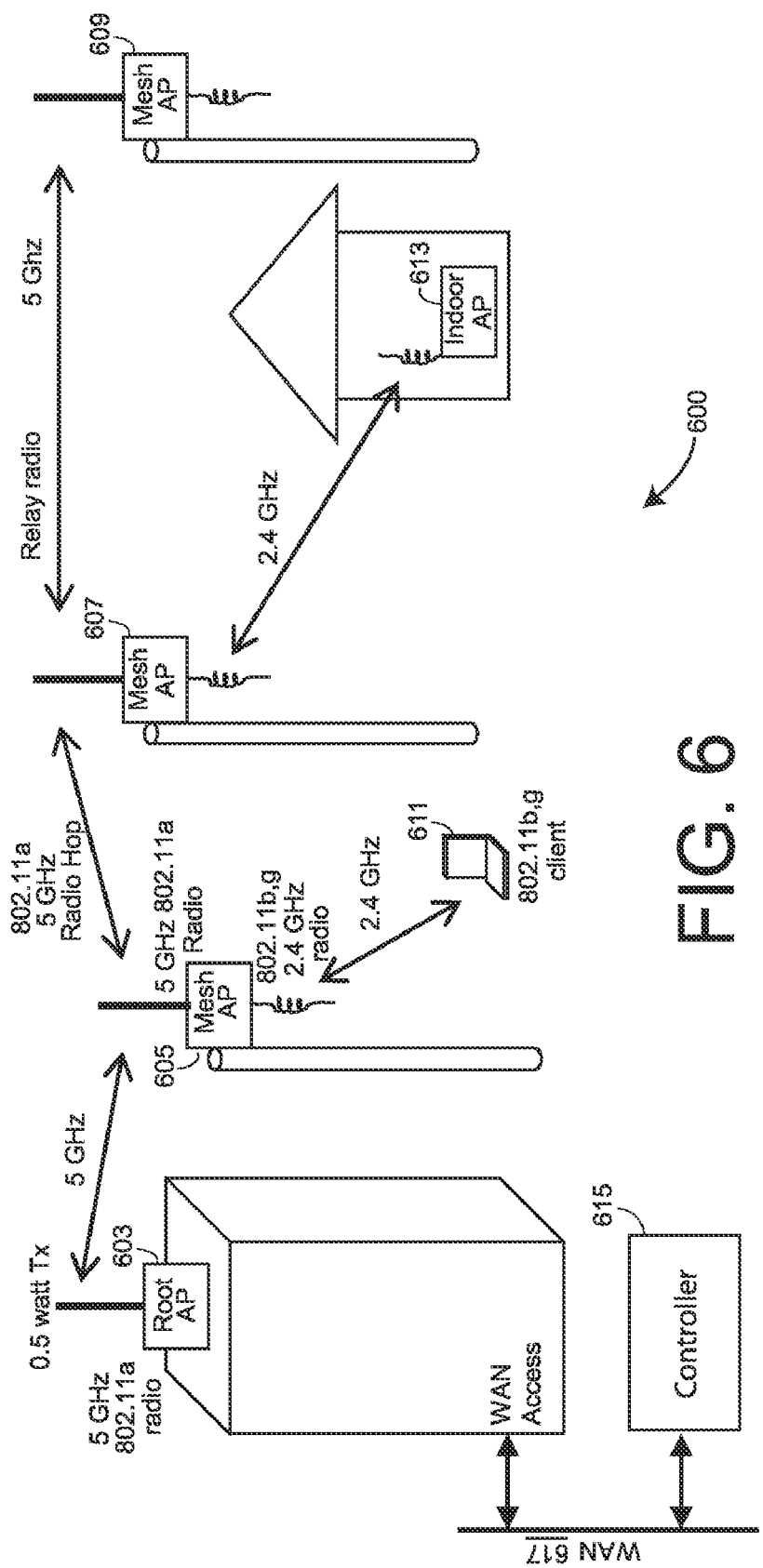
FIG. 6 shows an exemplary wireless mesh network in which an embodiment of the present invention can operate.

Recall that FIG. 6 shows an exemplary wireless mesh network 600 that includes of two types of mesh points: a root access point (root AP, RAP) 603, shown here on the roof of a building, and mesh access points (mesh AP, MAP) 605, 607, and 609 shown here on a pole-top. Each of these also acts an access point. Aspects of the present invention are described operating in the exemplary network of FIG. 6. While a network such as mesh network 600 may be prior art, a network such as mesh network 600 that operates according to aspects of the present invention is not prior art. Thus, no prior art designation is included.

The description herein assumes a wireless network that operates according to the IEEE 802.11 wireless local area network (WLAN) standard. However, each of the LWAPP protocol and the present invention is not restricted to such networks.

While in some network architectures, a separate mesh controlling entity, called a Mesh Controller, is used to control mesh network aspects, using LWAPP, in the description herein, a single entity, the Controller performs all mesh control functions, so that the WLAN Controller functions as well as the Mesh Controller functions are carried out in a single Controller 615, shown coupled to the root AP 603 by a network 617.

In one embodiment an intrusion detection system is included and managed by the Controller 615. The intrusion detection system is operative to detect rogue access points, and includes an exclusion data structure of blacklisted MAC addresses.

Recall that root access points such as root AP 603 are mesh APs that have a direct connection to the Mesh Controller, that in an embodiments described herein is the Controller 615 that is part of a wired network, and that may further provide an uplink to other networks, e.g., the Internet, or some other wired network. Thus, as used herein, the root AP 603 is a mesh AP that has a network interface to the Controller 615 in addition to a backhaul wireless interface to connect to other mesh points. The root AP 603 can have a second wireless interface to connect with client stations, acting as an AP for the client stations. FIG. 6 does not show such a second wireless interface to the root AP 603.

Thus, the root AP 603 has a direct LWAPP connection back to a Controller 615 that manages the mesh network, e.g., to form the loop-free tree topology.

In the examples described herein, the Controller 615 also acts as an authentication server. A root AP 603 uses the backhaul wireless interface to communicate to neighboring mesh APs 605, 607, and 609. Thus, root APs are the root nodes to any bridging or mesh network and connect a bridge or mesh network to the wired network. Root APs form the roots of any wireless mesh networks that have a tree topology.

As used herein, mesh APs are APs that are also mesh nodes. FIG. 6 shows mesh APs 605, 607, and 609. The architectures discussed herein are when the mesh nodes also are operative as lightweight APs. Mesh APs 605, 607, and 609 are mesh points and APs that have no wired connection to a Controller. A mesh AP 605, 607, 609 has a backhaul wireless interface to connect to other mesh points, shown here as an 802.11a 5 GHz radio interface. A mesh AP 605, 607, 609 has a second wireless interface, shown here as an 802.11b,g 2.4 GHz radio interface to connect with client stations, acting as an AP for the client stations. They can be completely wireless supporting clients, communicating to other mesh APs and root APs to access an external network, or as described in the following paragraph, a mesh AP can have a wire interface connectable to a wired network, and serve a bridging entity to a remote wired network.

Note that in one embodiment, some mesh APs can act as both a bridging entity, and as a routing entity. Each mesh point includes a memory, and maintains in the memory a forwarding data structure, e.g., a forwarding table that includes bridging information that shows/provides information on all entities directly connected to the entity, and routing information for how to route, e.g., to a parent or child of the tree of the mesh network. Each mesh AP also includes in its memory an adjacency data structure that maintains information on the tree, e.g., the MAC address of any parent, and of any children. Thus, in the case a mesh AP is also coupled to a wired network, when the mesh AP receives data from a child, it looks up its forwarding data structure by first looking up its bridging information. If the destination of the data is in a wired network connected to the mesh AP, the mesh AP's bridging information so indicates, and the mesh AP send the information on. If not, the mesh AP looks up the routing information, and then sends the data frame on to its parent in the mesh tree topology.

Because mesh APs form point-to-point or point-to-multipoint connections, and additionally and simultaneously, act as an AP, a mesh AP typically includes at least two radio transceivers that can operate simultaneously, as described above.

Not shown in FIG. 6 are mesh points (MPs) that act as wireless bridging nodes, but that do not include the AP functionality. Such mesh points may be included in the network.

The mesh points, whether also access points, or only mesh points of a wireless mesh networks route traffic. Typically, the mesh points form a tree topology for routing traffic between these mesh points, with the mesh point that has a portal to the wired network forming the root of the tree. In the exemplary network 600 shown in FIG. 6, the root AP 603 forms the root of the tree topology.

Architecture of a Wireless Mesh Station

One version of the methods described herein operate in a wireless mesh station, e.g., an outdoor wireless mesh station that can act as either a mesh AP or a root AP, or indeed as simply a mesh point without the AP functionality. The operation is, for example, by executing software that resides in the wireless mesh station. One embodiment of the wireless mesh station includes two simultaneous operating radio transceivers. One of the radio transceivers operates the IEEE802.11b/g protocol (MAC and PHY) in the approximately 2.4 GHz band to allow wireless connections to 802.11b/g clients. The second radio transceiver operates the IEEE802.11a protocol in the approximately 5 GHz band to allow point-to-point (P2P) connections, point-to-multipoint (P2MP) connections, and connections between mesh points in a mesh, called the backhaul wireless connection, as described herein. Note that other embodiments use other frequency bands, and indeed, other embodiments operate under other than the IEEE 802.11 standard. Furthermore, in some versions, more than two radios may be included. Furthermore, in a simple mesh point, a single radio transceiver may be included.

Figure 12:
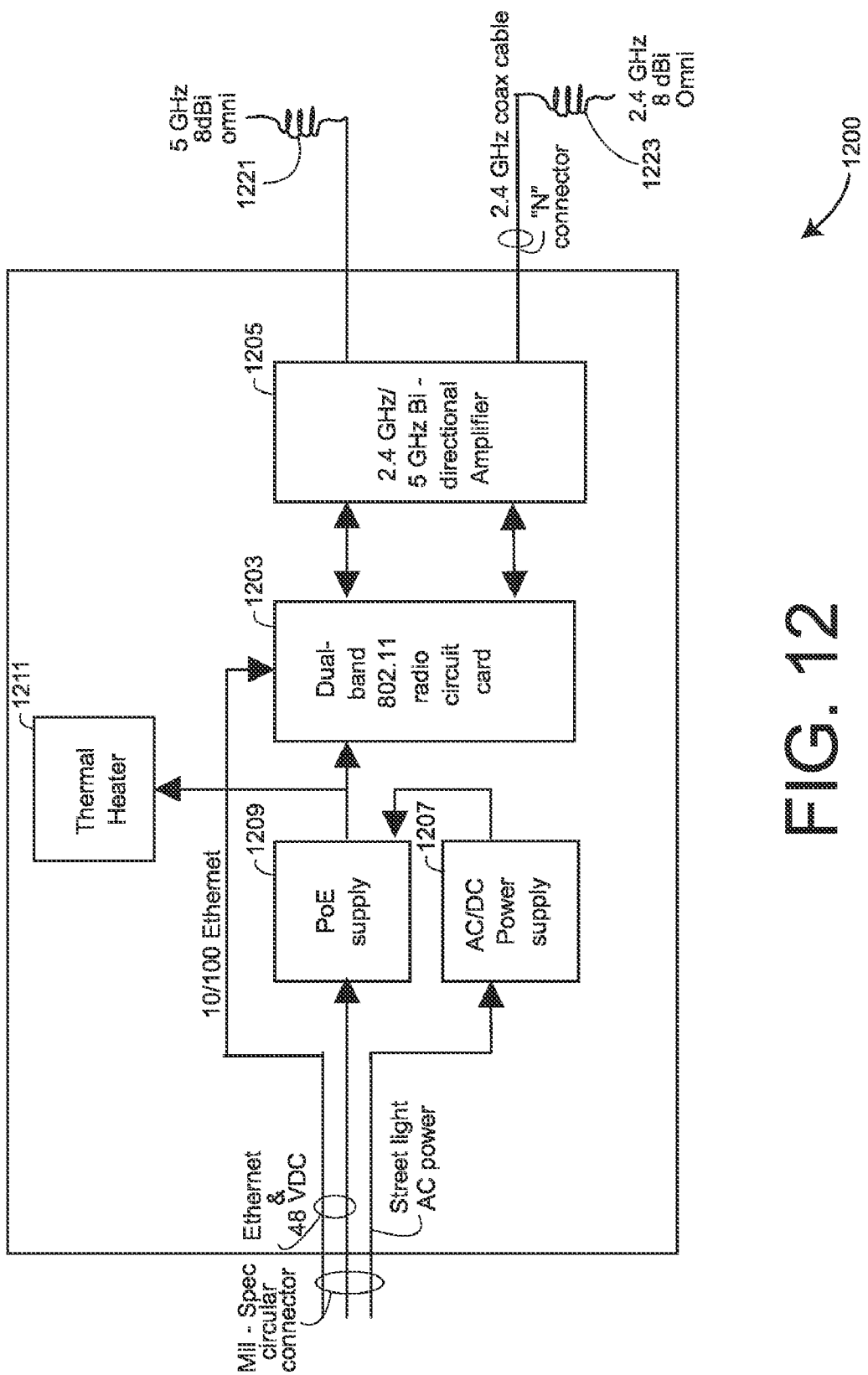
FIG. 12 shows a simplified block diagram of a dual-band wireless mesh station that can act as a mesh AP or a root AP according to aspects of the present invention.

FIG. 12 shows a simplified block diagram of a dual-radio wireless station 1200 used in one embodiment for mesh APs 605, 607, and 609, and for the root AP 603. While a station such as station 1200 may be prior art, a station such as station 1200 that includes software for operating according to one or more aspects of the present invention, is not prior art. Thus, no prior art designation is included. The station 1200 includes a dual-band radio circuit card 1203, a bi-directional amplifier 1205, an WLC power supply 1207, a power-over-Ethernet (PoE) power supply 1209, a thermal heater 1211, and external connectors. One version of the wireless mesh station is powered from an extended range WLC power supply 1207 accepting an input of 95 to 260 VAC. The wireless mesh station contains a ½-watt transmit amplifier in the 5 GHz band in 1205, and sends the 5 GHz band signal out of a high gain omni-directional antenna 1221. For operation as an access point (AP), the wireless mesh station contains a complete 2.4 GHz IEEE 802.11b/g radio with a high gain omni-directional antenna 1223 to connect to IEEE802.11b/g clients. Note that typically, the 2.4 GHz band does not have enough bandwidth to allow four non-overlapping modulated transmitters. However, in one embodiment, a frequency reuse plan is adopted in this frequency band by overlapping adjacent channels to support a greater density of client users.

Figure 13:
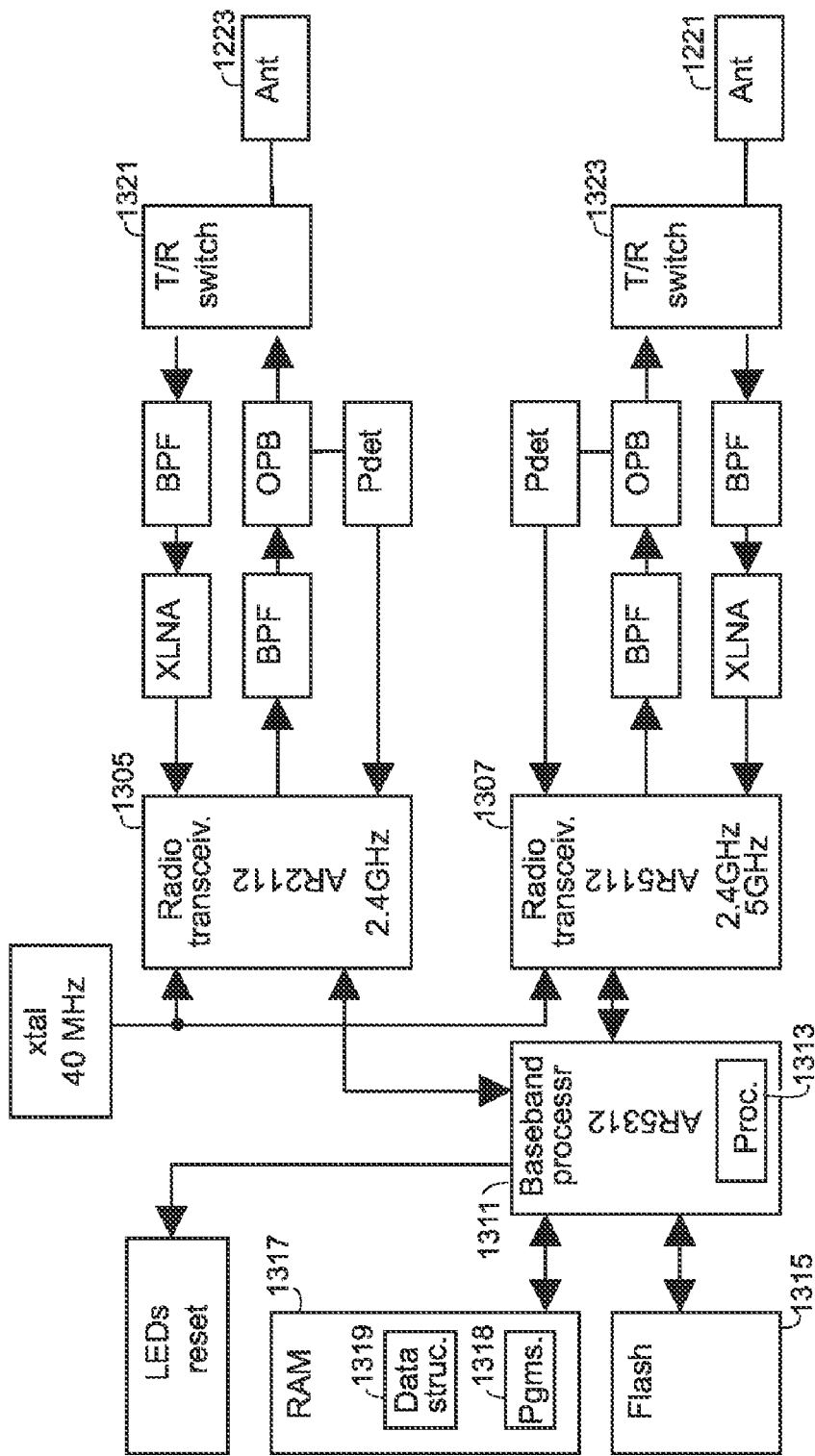
FIG. 13 shows a simplified block diagram of the dual-band radio circuit card of the dual-band wireless mesh station of FIG. 12.

FIG. 13 shows a simplified block diagram of one embodiment of the dual-band radio circuit card 1203 of the mesh station of FIG. 12. The dual-band radio circuit card 1203 has both a 2.4 GHz 802.11b/g radio and a 5 GHz 802.11a radio. These radios can operate simultaneously. The circuit card includes a chip set by Atheros Communications (San Jose, Calif.). The radio front-end includes two transceiver integrated circuits, one an Atheros AR5112 integrated circuit 1307 that can operate in both the 2.4 and the 5 GHz bands, and is used for the 5 GHz, and the second an Atheros AR2112 integrated circuit 1305 that operates only in the 2.4 GHz band, and is used for the AP operations to connect to client stations.

Each front-end transceiver 1305, 1307 is coupled to an Atheros AR5312 used as a baseband processor 1311. The Atheros AR5312 contains a 220 MHz MIPs microprocessor, a SDRAM Controller, a Flash Controller, two IEEE 802.3 Ethernet MACs, a UART, a low speed UART, GPIO, two IEEE 802.11 MACs, and two IEEE 802.11 baseband PHYs, along with two sets of ADCs and DACs. The baseband processor AR5312 chip 1311 is coupled to flash memory 1315 that include some factory settings, and to a memory—a RAM 1317. The RAM 1317 includes programs 1318 in the form of instructions, that when executed by the processor 1313 of the AR5312 chip 1311 shown in the block marked Proc. to implement one or more aspects of the present invention that care carried out at a mesh AP or root AP.

The RAM 1317 also stored some of the data structures 1319 used to implement one or more aspects of the invention. The RAM 1317 maintains the forwarding data structure in 1319 that includes bridging information and routing information, and also the adjacency data structure in structures 1319. The RAM furthermore maintains, as part of structures 1319, some of the keys described herein used for the security management.

In one embodiment, one or more state machines are operative in the mesh AP. Depending on the role of the mesh AP, e.g., as a child mesh AP, a parent mesh AP, a root AP, different instances of the state machine may be instantiated, e.g., for each role. In one embodiment, the instantiations operate as software that when executed on the MIPs microprocessor 1313 of the radio, execute the state machine instance. The software resides as instructions as part of the programs 1318 in the memory 1317.

Architecture of a Controller

Aspect of the present invention and of the standard lightweight access point protocol (LWAPP) operate with a Controller 615 that is coupled to the root AP. FIGS. 2 to 5 show operation of some of the protocols described herein, and show a Controller 615 and also an authentication, authorization and accounting (AAA) server, e.g., a Remote Authentication Dial-In User Service (RADIUS) server coupled to the Controller 615. The RADIUS server, as described below, acts as an authentication server (AS). Other servers such as a DNS server, A DHCP server and a wireless network control server may be present. There also may be more than one instance of any of these servers.

Note that FIGS. 2 to 5 each show the Controller 615 as a separate device in order to describe aspects of the invention functionally. Thus, in one embodiment, the Controller 615 and the authentication server 203 are in the same network device. Furthermore, the device incorporating Controller 615 and RADIUS server 203 may also perform other functions, e.g., network device 203 may act as a switch and may also act as a WLAN manager managing the setting of radio parameters.

Of course, in alternate embodiments, the Controller 615 and authentication server are in separate devices, as would be understood by those in the art.

The coupling of the Controller 615 to the root AP of a mesh may be direct, or via a network, e.g., network 617 of FIG. 6. In one embodiment, the coupling is via a fast network such as a Gigabit Ethernet.

Figure 2:
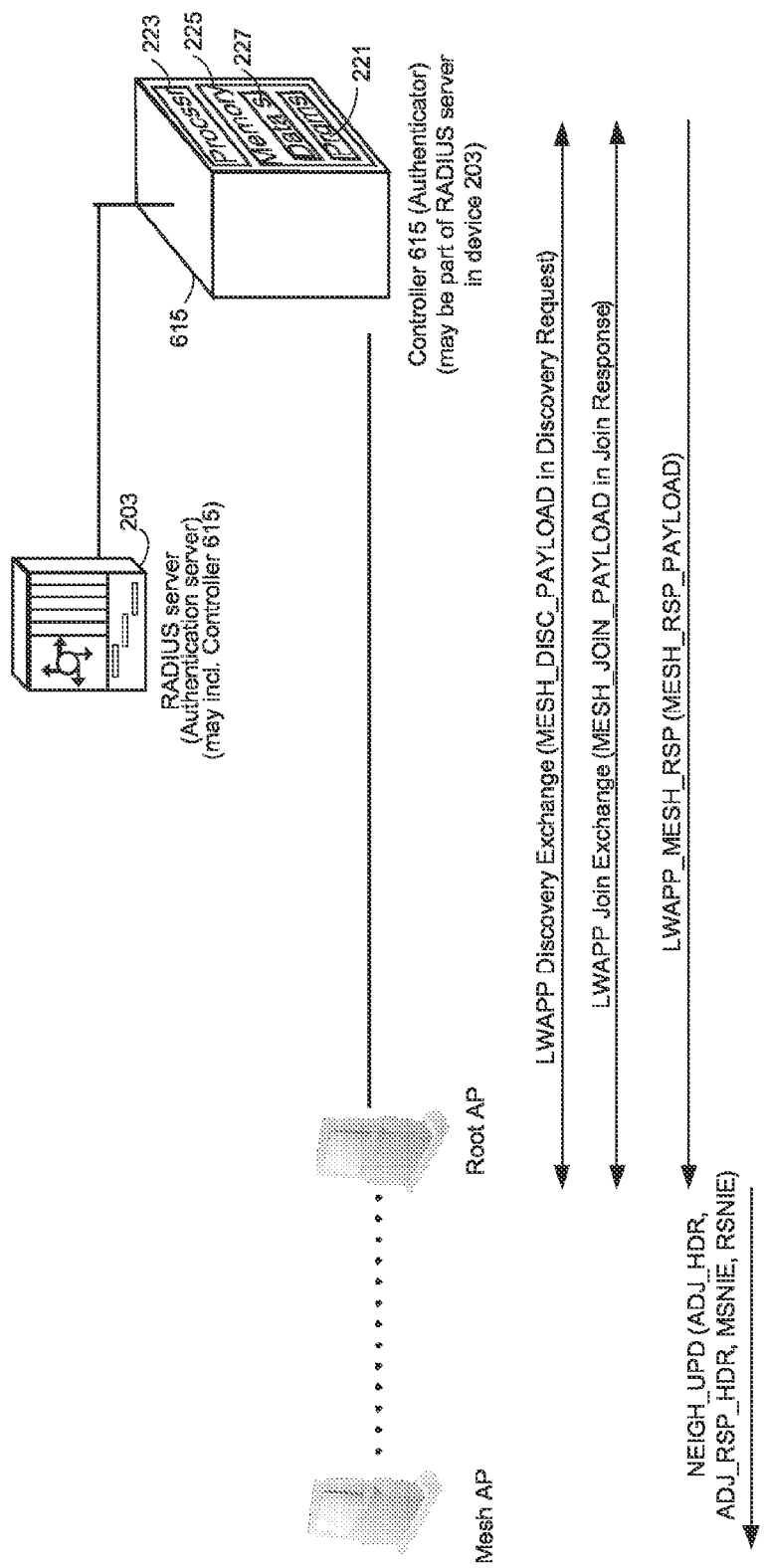
FIG. 2 shows an example of a root AP (mesh AP-over-Ethernet) Association and Authentication process.

FIG. 2 shows a simplified representation of the Controller 615 in order to show some of the elements of the device. In one embodiment, the Controller 615 includes a Controller processing system that has a Controller host processor 223 and a Controller memory 225 coupled to the Controller processor 223 via a bus subsystem (not shown). Some aspects of the present invention are in the form of software, i.e., computer readable instructions 221 that when executed by the Controller processor 223 carry out one or more steps of a method embodiment of the invention. Thus, aspects of the invention are in the form of instructions 221 carried in a computer-readable storage medium, e.g., memory 225.

Some aspects of the invention are managed by one or more state machines operative in the Controller 615 that are implemented by the form of software (instructions), also shown as instructions 221 in memory 225, that when executed on the Controller host processor 223 cause the processor to implement the state machine(s). One such state machine is an LWAPP state machine that runs aspects of the LWAPP protocol, and another is a mesh control protocol, including the security aspects described herein.

Several data structures 227 are used in the Controller 615 carrying out its function. In one embodiment, such data structures 227 are maintained in the processing system, e.g., in the memory 225 coupled to the Controller host processor 223.

In one embodiment an intrusion detection system is included and managed by the Controller 615. The intrusion detection system is operative to detect rogue access points, and includes an exclusion data structure of blacklisted MAC addresses. The exclusion data structure is included in the data structures 227 shown in memory 225.

Those in the art will understand that the Controller processing system in Controller 615 may include a storage subsystem that has one or more storage devices such as one or more hard disks. While instructions 221 and data structures 227 are shown in memory 225, those in the art will understand that all of the instructions 221 and/or all of the data structures 227 may not be in the memory at the same time, but that rather, in general, there is a computer-readable storage medium configured with the instructions, and that stores the data structures, and that such computer-readable storage medium in one embodiment is the storage subsystem in combination with the memory.

Adaptive Wireless Path Protocol (AWPP)

One version of the methods described herein runs on an wireless mesh station, e.g., outdoor mesh station as described above that can act as a mesh point and that also is operative as a lightweight AP. When a mesh AP is also connected to a Controller 615 via a wired network, e.g., to provide a direct link to the Controller 615 and an uplink to the wired network that includes the Controller 615, the outdoor wireless mesh station can also act as root AP.

One aspect of mesh networks is for mesh points to discover their neighbors, and for the network to adaptively form a loop-free tree topology. The mesh network 600 described herein essentially uses the methods of a protocol called Adaptive Wireless Path Protocol (AWPP), as described in detail in U.S. patent application Ser. No. 11/213,287 filed Aug. 26, 2005 to Castagnoli, et al., and titled "AUTOMATIC ROUTE CONFIGURATION IN HIERARCHICAL WIRELESS MESH NETWORKS," assigned to the assignee of the present invention. The contents of U.S. patent application Ser. No. 11/213,287 are incorporated herein by reference, and referred to herein as the "AWPP Patent."

Figure 7:
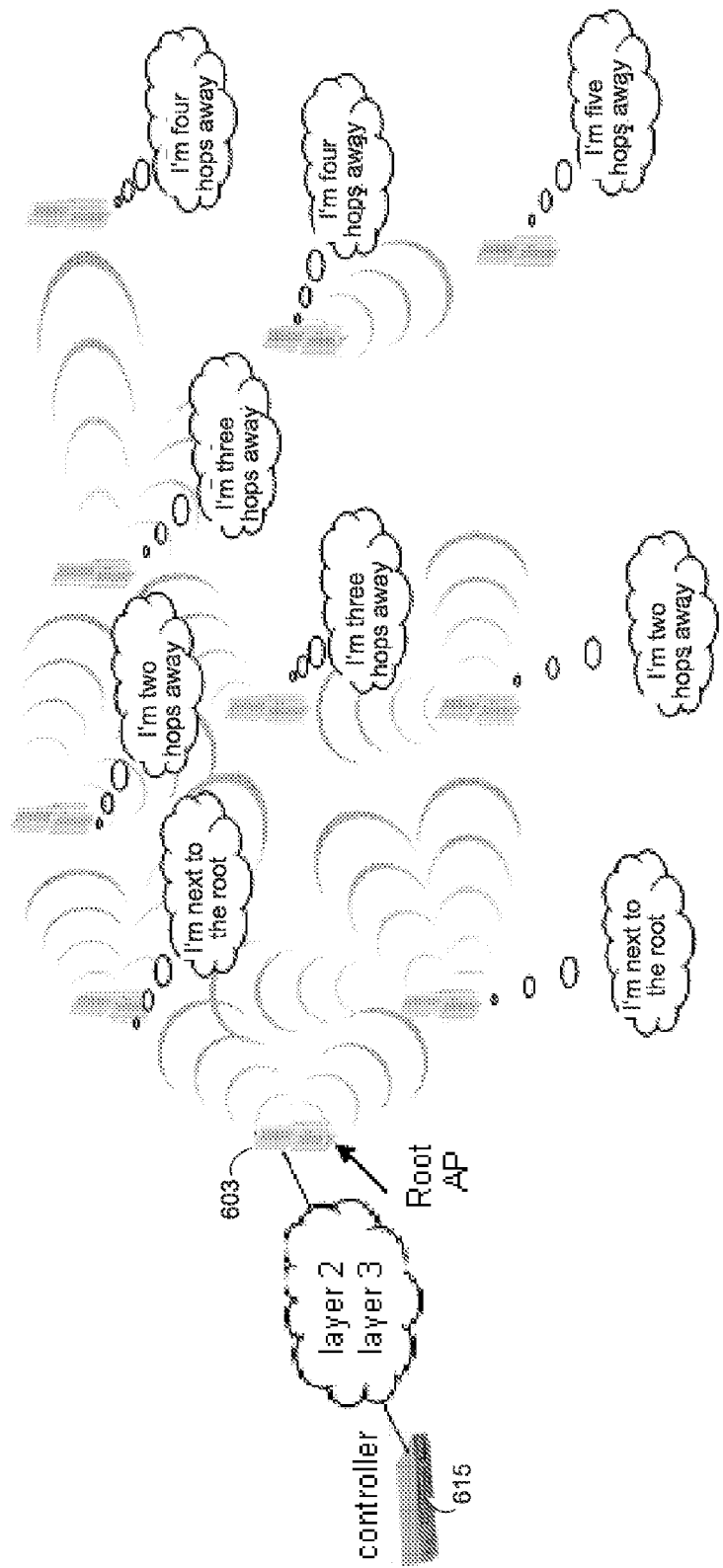
FIG. 7 shows a simple illustration of neighbor discovery according to LWAPP.

FIG. 7 illustrates AWPP neighbor discovery in the wireless mesh network 600, shown here with more mesh APs than FIG. 6. In one implementation, when a wireless mesh station is powered on, it first checks to see whether it is connected to a Controller, e.g. Controller 615 via a wired network 617. If the wireless mesh station is connected to a Controller 615, it becomes a root AP (RAP) 603, as illustrated in FIG. 7. If not, the wireless mesh station AP becomes a mesh AP and sends out a REQUEST message to all of its neighbors. The neighbors that receive this REQUEST may send back a REPLY carrying the value of hop count and the measured signal-to-noise ratio (SNR) on the received REQUEST message. The hop count at each mesh AP represents the number of backhaul links from the current mesh AP to the root AP. Upon receiving the first REPLY back, the mesh AP chooses the first neighbor that sends back a REPLY as its parent and updates the parent list if better parents are found. Each mesh AP has exactly one parent but may have one or more children. In one version, a neighbor can send back a REPLY only when it knows its hop count back to the root AP. The neighbor discovery procedure terminates once all the nodes in the mesh network have found a parent node, as shown in FIG. 7. At that point, a tree topology has been discovered amongst the mesh APs. Note that some of the mesh APs may have the AP functionality disabled, so that they are simply mesh nodes.

One implementation of the neighbor discovery is as a layer-2 routing protocol. Details are in the above-mentioned AWPP Patent. In such a layer-2 implementation, data packets are routed on the backhaul based on relay nodes' MAC addresses. In the layer-2 protocol, a mesh AP chooses a parent based on two measurements: the hop count and SNR.

Figure 8:
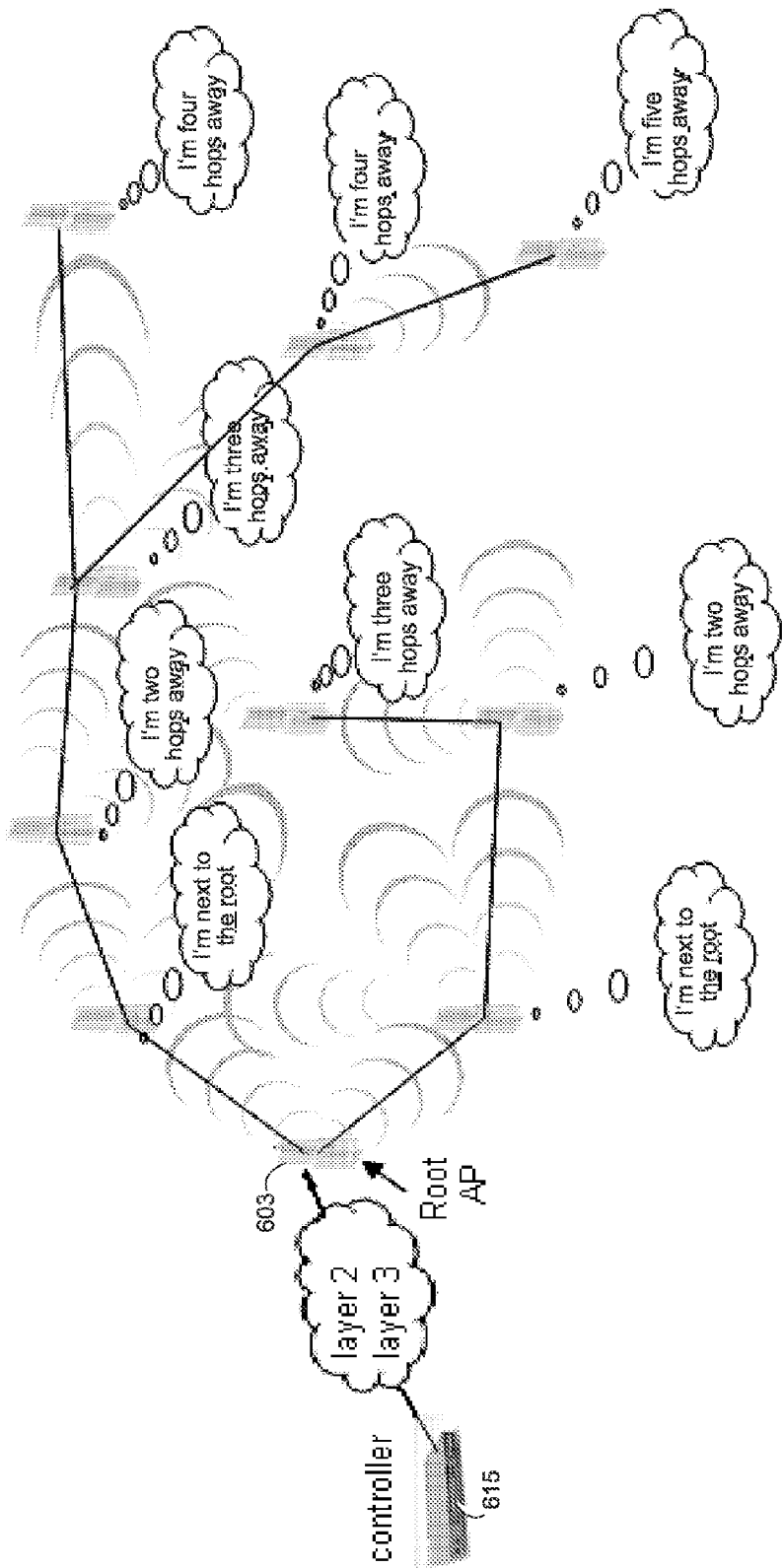
FIG. 8 shows a simple illustration of route establishment according to LWAPP.

FIG. 8 illustrates a route set up procedure according to AWPP. At initialization or periodically, each mesh AP sends out a REQUEST with its own MAC address and, if applicable, its parent's MAC address to its neighbors. Upon receiving the REQUEST message, a neighbor checks to see whether it is the parent by comparing its own MAC address with the parent MAC address carried in the REQUEST. If there is a match or if there is no parent address in the REQUEST, the neighbor sends back a REPLY carrying its own MAC address, a hop count, and the SNR, denoted as $S_1$, measured on the received REQUEST mesh AP receives the REPLY and measures the SNR, denoted as $S_2$, on the received REPLY message.

Based on $S_1$ and $S_2$, smoothing is performed and a moving average of the combined SNR is calculated This moving average, denoted by adjlinkSnr, is an indicator of the link quality between the current mesh AP and its parent Then, a link cost metric, called "ease", is calculated based on adjlinkSnr The following table Table 1 describes the relationship between adjlinkSnr and "ease"

TABLE 1

Mapping between adjlinkSnr and UnadjustedEase

| adjlinkSnr | UnadjustedEase |
|---|---|
| >20 | $2^{20}$ + (adjlinkSnr − 20) * 400000 |
| <=20 | $(2^{adjlinkSnr})$ |

The routing metric is calculated based on "ease" and the hop count, as shown in the following equation. A route with the highest adjustedEase value is then chosen by mesh AP.

$$adjustedEase = \frac{\min(ease\_at\_each\_hop)}{Hop\_count}.$$

In the above equation, when Hop_count is zero, it should be positive infinite.

Figure 9:
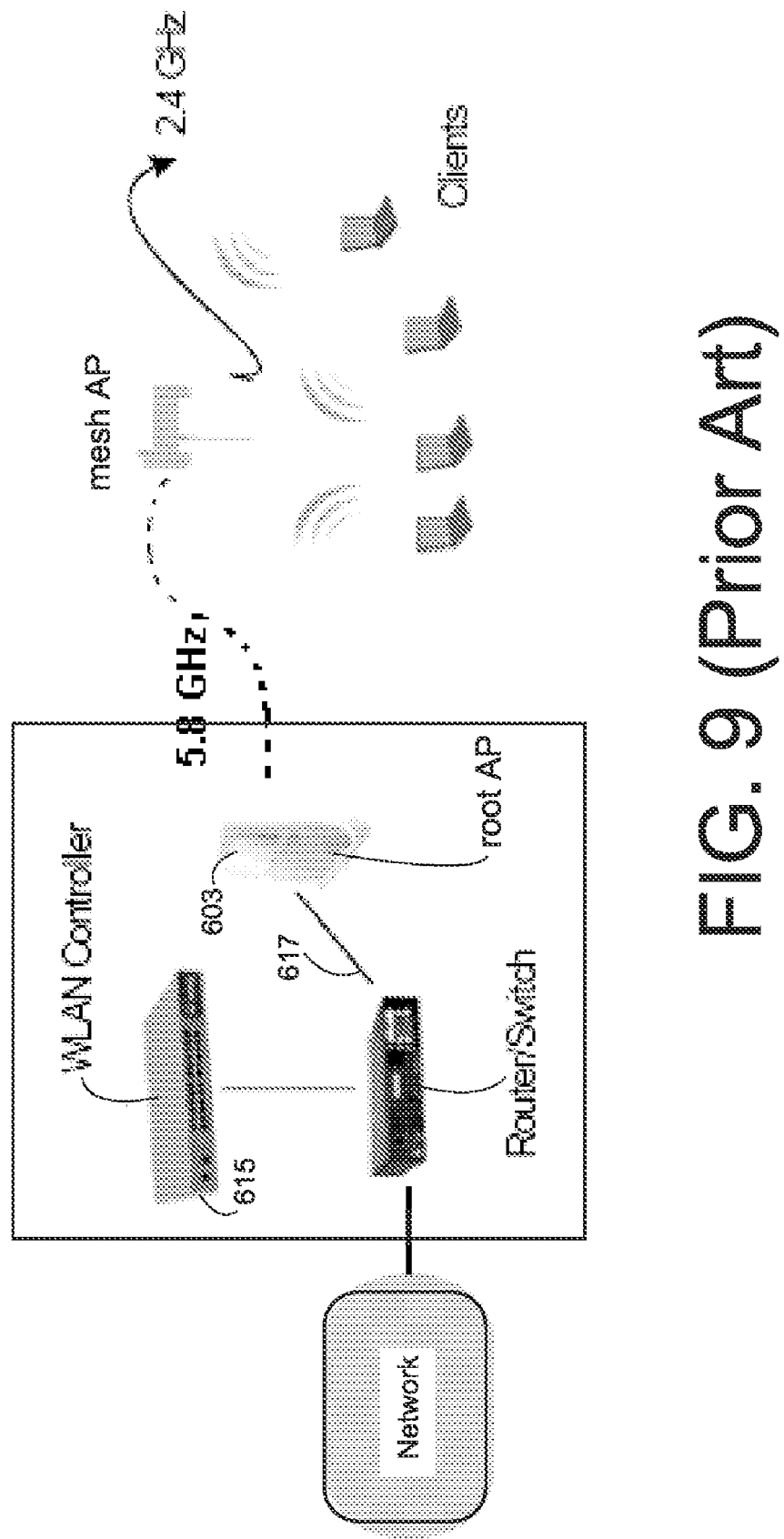
FIG. 9 shows a simple example of point-to-point bridging to a remote building according to LWAPP.
Figure 10:
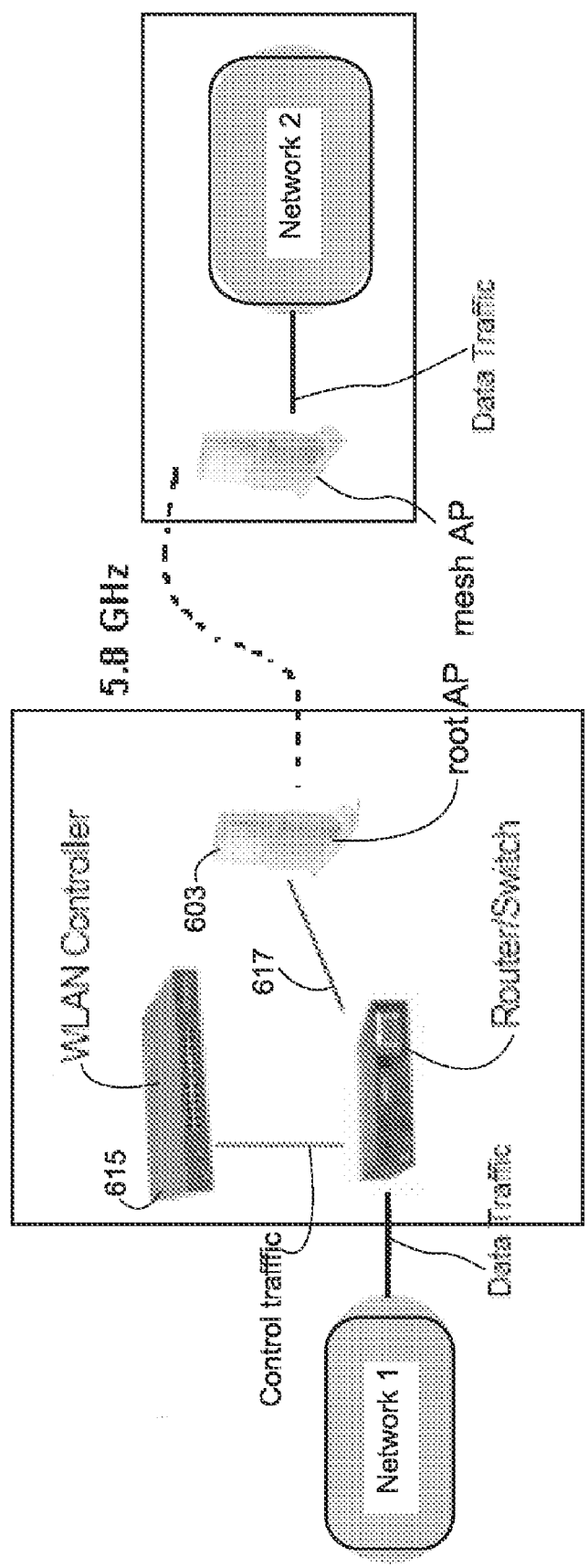
FIG. 10 shows a simple example of point-to-point bridging connecting two buildings according to LWAPP.

The wireless mesh AP station that can be a root AP or a mesh AP can also be deployed for the purpose of point-to-point (P2P) bridging. Two deployment scenarios may happen. FIG. 9 illustrates an exemplary scenario of P2P bridging to a remote building, while FIG. 10 illustrates an exemplary scenario of P2P bridging connecting two buildings. In both exemplary scenarios, the access point that is directly connected to a switch is automatically configured as the root AP. The other access point becomes the mesh AP. Traffic flows both ways between the root AP and mesh APs. In this example, as in FIG. 6, the root AP and mesh APs communicate with each other using the approximately 5 GHz, e.g., 5.8 GHz backhaul radio.

Figure 11:
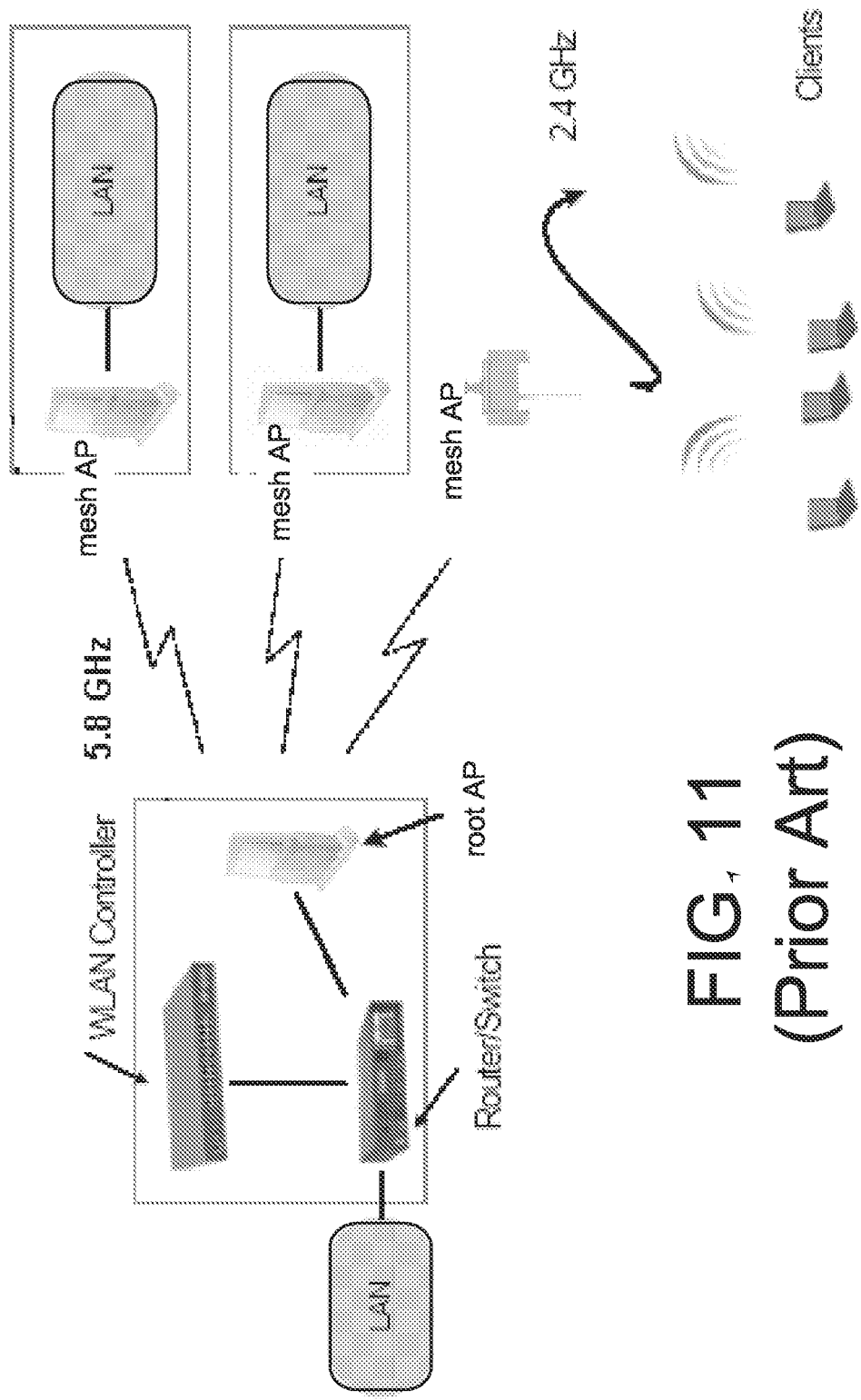
FIG. 11 shows a simple example of point-to-multi-point bridging according to LWAPP.

FIG. 11 illustrates Point-to-MultiPoint (P2MP) bridging that connects a root AP to multiple mesh APs. The access point that is directly connected to a switch that, in this embodiment, is also a Controller, is automatically configured as a root AP. All other access points become mesh APs. The root AP and mesh APs communicate with each other, for example, through the approximately 5 GHz, e.g., 5.8 GHz backhaul radio. Under the Point-to-multi-point bridging mode, communication among mesh APs is not supported.

Security in Present-Day Implementations

The present invention is related to security on mesh networks, and to rapid secure roaming.

Mesh networks produced by Cisco Systems, Inc., related to the assignee of the present invention, have used security extensions to LWAPP we refer to herein as "existing LWAPP mesh security protocol." For more details on LWAPP security, see the above-mentioned LWAPP IETF draft "draft-ohara-capwap-lwapp-03.txt." See also Clancy, C., "Security Review of the Lightweight Access Point Protocol", Department of Computer Science, University of Maryland, College Park, Md., May 2005, available for download at http://www.cs.umd.edu/~clancy/docs/lwapp-review.pdf on May 25, 2006. See also Cheng Z., M. Nistazakis and R. Comley: "Security Analysis of LWAPP", 2nd International Workshop on Wireless Security Technologies IWWST-2004, London, UK, April 2004, available for download at www.cs.mdx. Ac.uk/staffpages/m_cheng/link/lwapp_g.pdf on May 25, 2006.

Mesh security includes some additional aspects not in non-mesh wireless security. When a mesh is formed, a discovery phase includes neighbor solicitation messages and responses form neighbor relationships. When a child selects its tentative parent mesh AP, it sends another unicast message to the selected potential parent mesh AP neighbor with its route information. This message forms the parent-child peering and also propagates the route for data traveling downstream from the root to the mesh AP. This neighbor protocol is prone to several possible attacks, including denial of service (DOS) and replay.

After the child adds the parent and AWPP sets the mesh path, recall that mesh security includes 1) link-level security, also called IEEE 802.11 security, and layer-2 security, for communication between a child mesh AP and a parent mesh AP; and 2) Tunnel security, also called LWAPP tunnel security, for communication between a child mesh AP and the Controller 615 via a secure LWAPP tunnel, also called a secure tunnel. Note that LWAPP tunnel does not encrypt data frames, but only LWAPP control frames. Thus, without link security, LWAPP data traffic would pass in clear text.

Figure 1:
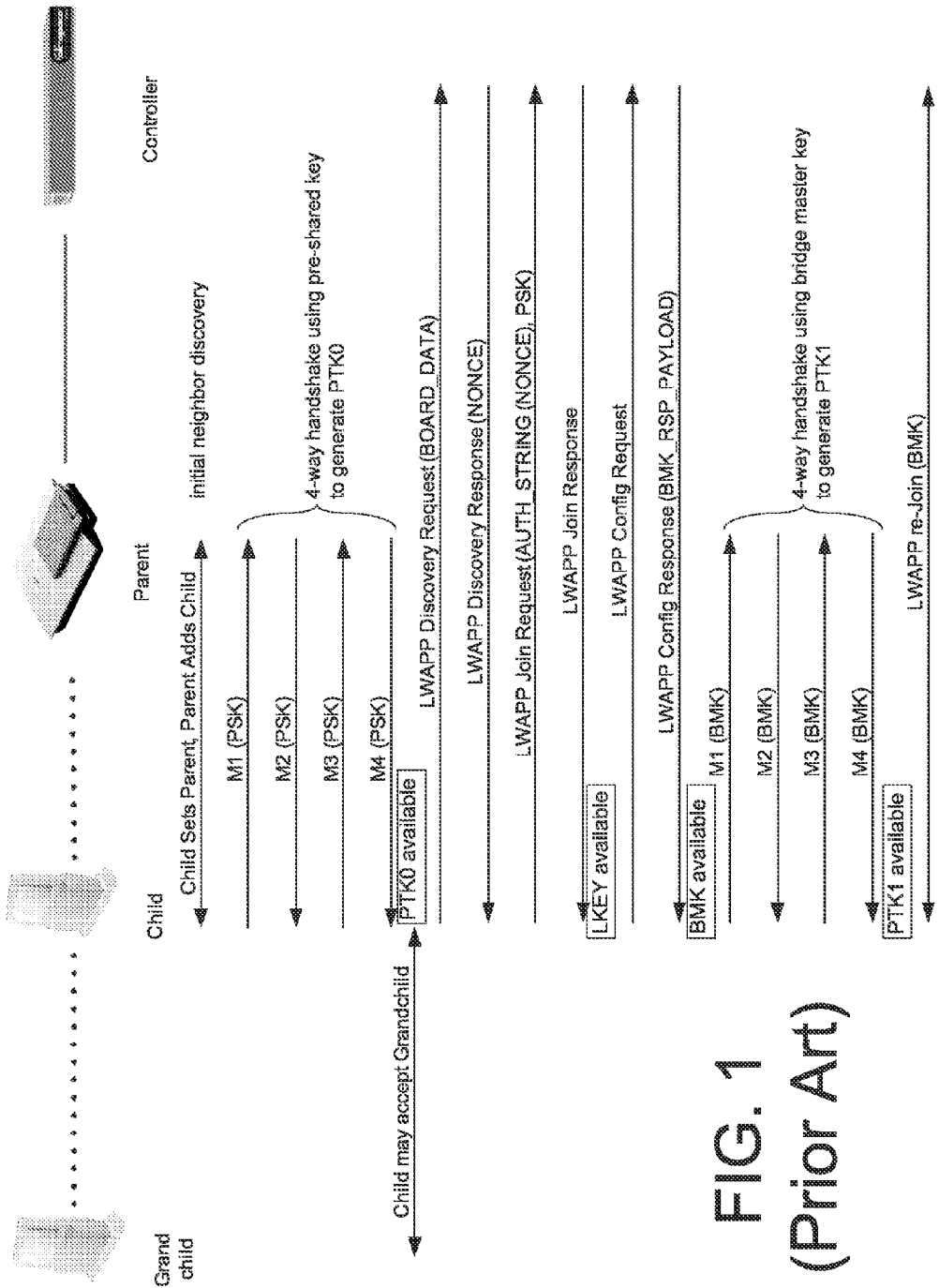
FIG. 1 shows an example in a simplified mesh network of the present-day Mesh Security Process for wireless mesh networks.

FIG. 1 illustrates the present-day wireless mesh security by way of a simple example. In FIG. 1 and in subsequent drawings showing securing the layer-2 link and the LWAPP connection, messages passed between a child mesh AP and the Controller are first passed to the parent mesh AP of the child mesh AP, then encapsulated in frames sent by the parent mesh AP on to the Controller, possibly via intermediate mesh points, e.g., intermediate mesh APs.

The existing LWAPP mesh security protocol is implemented using a security state machine ("the existing-method security state machine") that includes an existing link-level security state machine and an existing LWAPP tunnel security state machine, and that can be implemented in software, in hardware, or in a combination of software and hardware.

According to the existing link-level security (layer-2 security) method, in a mesh network, all mesh access points can join a Controller using a key called a pre-shared master key (PSK) that all mesh APs are set-up with at the factory, and that, in one version, incorporates the MAC address of the AP that uses it.

Thus, the pre-shared master key, PSK is the first key an AP uses in the process shown in FIG. 1. In the present day method, there are two cycles of LWAPP discovery, an initial join and configuration phases, and a final join/configuration phase, each beginning with a link-level security phase using the key of that phase. The pre-shared master key is used during the very first time as a "bootstrap" from which the Controller can provide the mesh AP with the BMK. Thereafter, the BMK is used as shown in FIG. 1

When a new mesh AP is to be added to a bridge group network, the new mesh AP is logically a Supplicant and the neighbor mesh AP that it will select as parent is the Authenticator. The existing LWAPP mesh security protocol uses a 4-way handshake that is modified from that of the IEEE 802.11i standard in that the order is reversed, to establish a secure link between a parent mesh and child mesh AP using one of the two keys, PSK or BMK. Those in the art will know the standard EEE 802.1x 4-way handshake. Furthermore, details of the standard EEE 802.1x 4-way handshake are in the published IEEE 802.1x standard (IEEE-Std-802.1x-2004).

Each modified 4-way handshake generates a key for communication between the mesh AP and a parent called a pairwise transient key (PTK).

Following the initial neighbor discovery and join of the child mesh AP deciding to be child mesh AP of the parent mesh AP is the 4-way handshake in which the initial order is reversed from a standard IEEE 802.11i in that the child mesh AP initiates the process by communicating M1 to the parent mesh AP. There are two more messages M2 and M3 exchanging information for deriving a key. The final message M4 is an acknowledgement. As a result of this exchange, a pairwise transient key, PTK0, good for exchanges between the child mesh AP and the parent mesh AP is available.

Thus, once the handshake is complete, the data-path is opened from the particular parent mesh AP to the particular child mesh using the generated pairwise transient key. A child can then communicate to the Controller via its parent mesh AP, and via the root AP for further authentication.

The next set of exchanges use this PTK0 and the already established secure communication between the parent and the Controller in order to communicate between the child mesh AP and the Controller, via the Parent mesh AP. Thus, to communicate with the Controller, the child mesh AP communicates securely with the parent mesh AP using the PTK0, and the parent passes the communication to the Controller using its secure LWAPP tunnel with the Controller. Initially, the child mesh AP issues a LWAPP discover request, with what we call BOARD_DATA, to find a Controller that will accept this child AP into the mesh, presumably the Controller. The Controller validates that is can accept the child mesh AP. If yes, in response to the child mesh AP's LWAPP join request, the Controller a LWAPP join response that includes the LWAPP key (LKEY) for securely communicating with the Controller.

Now that the child mesh AP has the LKEY, it can carry out secure LWAPP communication with the Controller. The child mesh AP sends a LWAPP Configuration request to obtain the bridge master key (BMK) that the Controller uses for parent-child communication. The Controller responds with an LWAPP Configuration response that includes, as payload, the bridge master key. The BMK is now the unique and secure key for the child mesh AP for communicating with the particular Controller.

Now that the BMK is available, the child mesh AP and the parent mesh AP undergo a second authentication exchange, starting with a new 4-way handshake, 802.11i-like, but again reversed in that it is initiated by the child rather than the parent, but this time using the Controller's BMK is now used to ensure security.

At the end of the 4-way exchange, a new PTK, say PTK1, is available, for communicating between the child and the parent.

In the final phase, the child mesh AP and the Controller undergo an exchange to re-join the mesh network and re-establish a secure tunnel between the Controller and the child mesh AP. The secure tunnel to the Controller includes the secure link between the child and the parent-child using PTK1.

In a typical implementation, the Controller has a MAC filter that includes a MAC filter list of APs that are acceptable to the Controller, e.g., in the form of their MAC addresses. The MAC filter is used to authenticate valid mesh APs. In one implementation, each entry in the MAC filter list must be entered manually by a network administrator.

For key refresh, in one implementation, a new bridge master key is pushed out to all mesh APs by a network administrator. In such an event, all mesh APs must reboot, disconnect and re-establish their backhaul with this bridge master key.

Typically, a mesh AP has a limit on how many children it will take. A rogue mesh AP attempting a table overrun attack will be able overrun this one mesh AP locally, so that attacker (s) will have to use distributed and coordinated attacks from different locations to disrupt the entire network.

Known Issues with the Existing LWAPP Mesh Security Protocol

The inventors and others have recognized several issues with the existing LWAPP mesh security protocol. These include:

1) Point-to-point and point-to-multi-point links between mesh APs are not well secured using pre-shared master keys. Because the Controller allows use of either PSK or BMK, attackers can foil the use of the MAC authorization list as there is no point of enforcement of PSK vs. BMK. That is, an attacker can pretend to be a legitimate mesh AP in the authorized list, and pretend to have lost the BMK and merely use the factory installed PSK. There is a need to include a point of enforcement to alert the Controller that a particular AP should no longer use the PSK because it has been given the BMK.

2) Once a mesh AP joins a Controller, including forming a secure tunnel to the Controller using PSK, it is required to download the BMK from the Controller and re-join using the BMK, including re-establishing the secure tunnel. This forces two cycles of setup (and often three if the mesh AP has a wrong BMK to start with) So, for example, roaming may take a long time. Furthermore, lack of policy prevents the Controller from enforcing the type of authentication and credential types that must be used by particular APs.

3) The Bridge Master Key or PSK is transported over the air in LWAPP configuration response frame, which is a global key on a per-Controller basis. Global keys are difficult to manage or refresh. Some of the more drastic issues with global keys are:
  a) Key refresh requires all mesh APs under the Controller to restart and rejoin with the new BMK.
  b) If there are multiple Controllers in the network, all of them must be configured with the same BMK.
  c) Lack of built-in key refresh mechanism causes a network administrator to manually refresh keys.

4) The BMK is distributed by the Controller using the LWAPP configuration response message. Thus, link-level security is intertwined with a routing state machine used to carry out AWPP routing. This complicates the state machines for implementing AWPP and LWAPP, and may cause the Controller and AP states to go out of synchronization.

5) BMK misconfiguration, e.g. two different BMKs on two different Controllers in the network may cause two mesh nodes to obtain different BMKs and fail to secure the link between them. This happens when the parent and child node are connected to two different Controllers. At the end, both nodes resort back to PSK mode and leaves the backhaul link between them protected by PSK only.

6) With the existing LWAPP mesh security protocol, a 4-way handshake is used that is not a fully 802.11i or WPA2 compliant. It merely uses 802.11i 4-way-like handshake, with the reversing of the supplicant, so not the same as a real IEEE 802.11i handshake, is used to derive a PTK using the PSK or BMK as the master key.

7) With the existing LWAPP mesh security protocol, it is not until the mesh AP has joined with the Controller and been properly configured that the Controller (and parent AP) know what VLAN and ACLs (access control lists) to enforce for traffic coming from the child mesh AP.

Furthermore, in order for a child mesh AP to roam from one parent mesh AP to another new parent mesh AP, both a new parent-child links AND a new LWAPP tunnel to the Controller needs to be re-established and re-secured. This may cause some disruption to service.

Thus, one or more aspects of the present invention describe a method and mechanisms for a child mesh AP of a mesh to rapidly roam from one parent to another, causing less disruption to services than previously existing methods such as shown in FIG. 1. Aspects of the present invention include providing for rapidly re-establishing a secure layer-2 connection to a new parent mesh AP, that is, rapidly providing link-level security, and rapidly re-establishing a secure LWAPP tunnel to the Controller.

Note that the need for rapid roaming in wireless networks has long been recognized. For example, the IEEE 802.11 WLAN standards committee has formed a task group (Task Group "r", so called TG-r) to establish a new standard, to be known as the IEEE 802.11r standard for rapid roaming within an IEEE basis service set. The rapid roaming methods being considered by TG-r deal with layer-2 aspects of client roaming. Aspects of the present invention include layer-2 roaming for child mesh AP of a wireless mesh network. Furthermore, there still is a need for rapid mesh roaming to re-establish a secure LWAPP tunnel from a child mesh AP to the Controller.

Thus, there is a need to the art to extend the roaming capabilities provided by the current TG-r proposal to enable rapid roaming of mesh points, such as mesh APs, including rapidly re-establishing a secure layer-2 link to a new parent, and a LWAPP tunnel between a child mesh AP and a Controller via the new parent.

Mesh Backhaul Security Protocol

A method and mechanisms are now described to establish both the link level, e.g. IEEE 802.11 link-level security, as well as the LWAPP secure tunnel between the Controller and a mesh AP. The mechanisms parallel session and secure context management mechanisms of standard non-mesh wireless network clients as follows:

Discovery: Neighbor Update advertisements are analogous to beacons to allow parent mesh APs to advertise the capabilities and (security) policy profiles.

Association: Mesh Association exchange allows for the child mesh AP and parent mesh AP to establish or refresh the link layer security context and if needed, to establish the secure LWAPP connection.

Authentication: In one embodiment, a 4-way handshake mechanism like 4-way handshake defined in the IEEE 802.11i standard is used to establish the link layer keying material.

By a Mesh Security Network or MSN is meant a WLAN mesh network that is secure by using the Mesh Backhaul Security Protocol according to one or more aspects of the present invention. One aspect of the invention is that the methods and techniques described herein for authenticating a mesh AP leverage IEEE 802.1x EAP and IEEE 802.11i, and further include additional aspects to operate in mesh networks, such as hooks in mechanisms described in those standards that are applicable to WLAN mesh networks. By so leveraging IEEE 802.1x EAP and IEEE 802.11i, some disadvantages of security as in present-day implementations are avoided.

In the descriptions below, a root AP is assumed to be present. The mesh network is built away from and starting from the root AP. The root and mesh APs are assumed to have the architecture shown in FIGS. 12 and 13. A parent mesh AP is an AP that is coupled via the mesh backbone to another mesh AP, called the child mesh AP. The APs are assumed to be lightweight APs coupled to a Controller. The Controller 615 is assumed to be part of Controller 615 that includes the elements shown in FIG. 2. The following entities have the following roles when interpreted in the context of the IEEE 802.1x EAP standard:

Authenticator: An entity at one end of a link or segment that facilitates authentication of the entity attached at the other end of the link or segment. The authenticator can be in any entity, for example, in the root mesh AP, or in a parent mesh AP, or in the Controller. In one embodiment description herein, the authenticator is the Controller 615 that is in communication with a RADIUS server 203. The RADIUS Server.203 may or may not be co-located in a Controller, depending on the implementation. In one embodiment, the authentication server 203 and the Controller 615 are in the same network device.

Supplicant: This is an entity at one end of a link that seeks to be authenticated by an authenticator at the other end of the link. In a mesh network, there are client supplicants that are typically wireless or wired network hosts. These clients authenticate themselves using standard IEEE 802.1x and/or IEEE 802.22i security protocols. Of more interest herein are infrastructure supplicants. These are mesh nodes that implement client-like supplicant state machines with extensions specific to their infrastructure roles. Security aspect so the invention involve a child mesh AP acting as supplicant to reside in and secure mesh backhaul links.

Authentication server: This provides authentication services to the authenticator, such as determining from the credentials provided by a supplicant whether the supplicant is authorized to access the services provided by the system. An example of an authentication server is an AAA/RADIUS server.

A mesh node with a wired backhaul, or a wireless mesh AP can also act as a parent proxy, also called a pass-through—an entity in the middle of a link or segment that facilitates authentication of a supplicant at one end of the link or segment by acting a proxy after being itself authenticated with an authenticator attached to the other end of the link or segment. In the embodiment described herein, a parent mesh AP acts as an pass-through (parent proxy).

Note that as in the case of the EAP definitions, there are equivalent Remote Authentication Dial-In User Service (RADIUS) definitions for each of the concepts described herein. Of course, while the present invention uses RADIUS, other authentication, authorization and accounting (AAA) mechanisms also are possible.

While the RADIUS Server, i.e., the authentication server may also be the policy enforcement server for mesh APs, in the description herein, for ease of explanation and, in practice, for ease of configuration and manageability, the Controller is assumed to be the authenticator, and policy enforcement agent for mesh APs. In different embodiments, the authentication server and the policy enforcement server may be implemented in one or more entities separate from the Controller.

Frame and Information Element Names and Definitions

In the following descriptions, frame names are introduced. Typically, the name of frames used for aspects described herein are in upper case letters, with underscore ("_") as appropriate. The names are in general descriptive of the function and/or purpose. The frames are further described in more detail herein below in a separate Section titled "Protocol Specifications—Basic Protocol Frame Structures" and in FIGS. 14-42.

In one embodiment, the mechanisms described herein are carried out by one or more state machines. Some of these state machines are operative in the Controller 615 e.g., as software executed by a processor 223 in the Controller 615 (see FIG. 2), while others are operative in the mesh APs, e.g., as software in 1318 of the memory 1317 executed by a processor 1313 in the mesh AP (See FIGS. 12 and 13).

Discovery Phase

The discovery phase is analogous to a standard 802.11 client discovery, and includes using what are called neighbor update frames that are broadcast or multicast by each mesh AP to advertise its capabilities as a parent mesh AP.

A mesh AP that has both an AWPP mesh link as well as a secure LWAPP tunnel is called "fully connected" herein. The child mesh AP process for selecting a parent mesh AP that is fully connected in that it has an AWPP mesh link and a LWAPP tunnel to the Controller uses the following flow:

A mesh AP discovers other mesh APs by passive scanning, listening for "mesh beacons", that is, neighbor update frames broadcast by other mesh APs that are fully connected. Any fully connected root AP or mesh AP advertises core security parameters in such neighbor update frames called NEIGH_UPD frames (See FIG. 14). NEIGH_UPD frames are also called mesh beacon frames because their function in a mesh is similar to those of an IEEE 802.11 beacon broadcast by an AP. A mesh AP wishing to join a mesh network caches routing and security parameters from received NEIGH_UPD (mesh beacon) frames and selects the mesh network to join, such a network characterized by a mesh domain ID (MDID). AWPP is used to select the appropriate parent mesh AP.

A mesh AP wishing to be a child mesh AP and potential parent mesh APs also can exchange frames called neighbor request NEIGH_REQ and neighbor response NEIGH_RSP frames. A NEIGH_REQ frame is sent to request information from mesh APs in the vicinity to find out all neighbors in the vicinity and their capabilities as a parent mesh APs, much like an IEEE 802.11 probe request frame is sent to any APs to request a probe response frame from any receiving AP. A NEIGH_RSP frame includes information similar to a NEIGH_UPD (mesh beacon) frame. Thus, a child mesh AP can attach to a particular neighbor parent mesh AP as a parent by sending a directed NEIGH_REQ frame to the particular parent mesh AP and including the parent mesh AP as its parent. The particular parent mesh AP attaches the child mesh AP as a child by responding to this NEIGH_REQ frame with a NEIGH_RSP frame.

A child mesh AP selects the parent mesh node sing AWPP. The parent selection typically includes the appropriate channel selection and a synchronization phase used in order to synchronize the timeslots between a directly connected parent-child pair.

Once this phase is over, a logical link between a child mesh AP and parent mesh AP is established. The next phase is the association phase.

Association Phase and the Controller's Validation of the New Child Mesh AP

The association phase is analogous to a standard IEEE 802.11 client associating to a standard access point. The distinction of course, is that the negotiation is to associate with the role of a mesh AP in a mesh network, rather than as a client to an AP in an infrastructure wireless network.

To become such a mesh AP, a connection to a parent is required, as well as a secure LWAPP tunnel connection to an authenticator, e.g., the Controller 615 that also acts as the Controller of the mesh AP.

FIG. 2 illustrates by simple example an authentication process for the root AP, and is self-explanatory in view of the description herein. In the discussion herein below, the root AP is assumed to already be connected to the Controller, so that the authentication process of FIG. 2, or a similar authentication process is assumed to have taken place. The process illustrated in FIG. 2 will not be discussed further.

Figure 3:
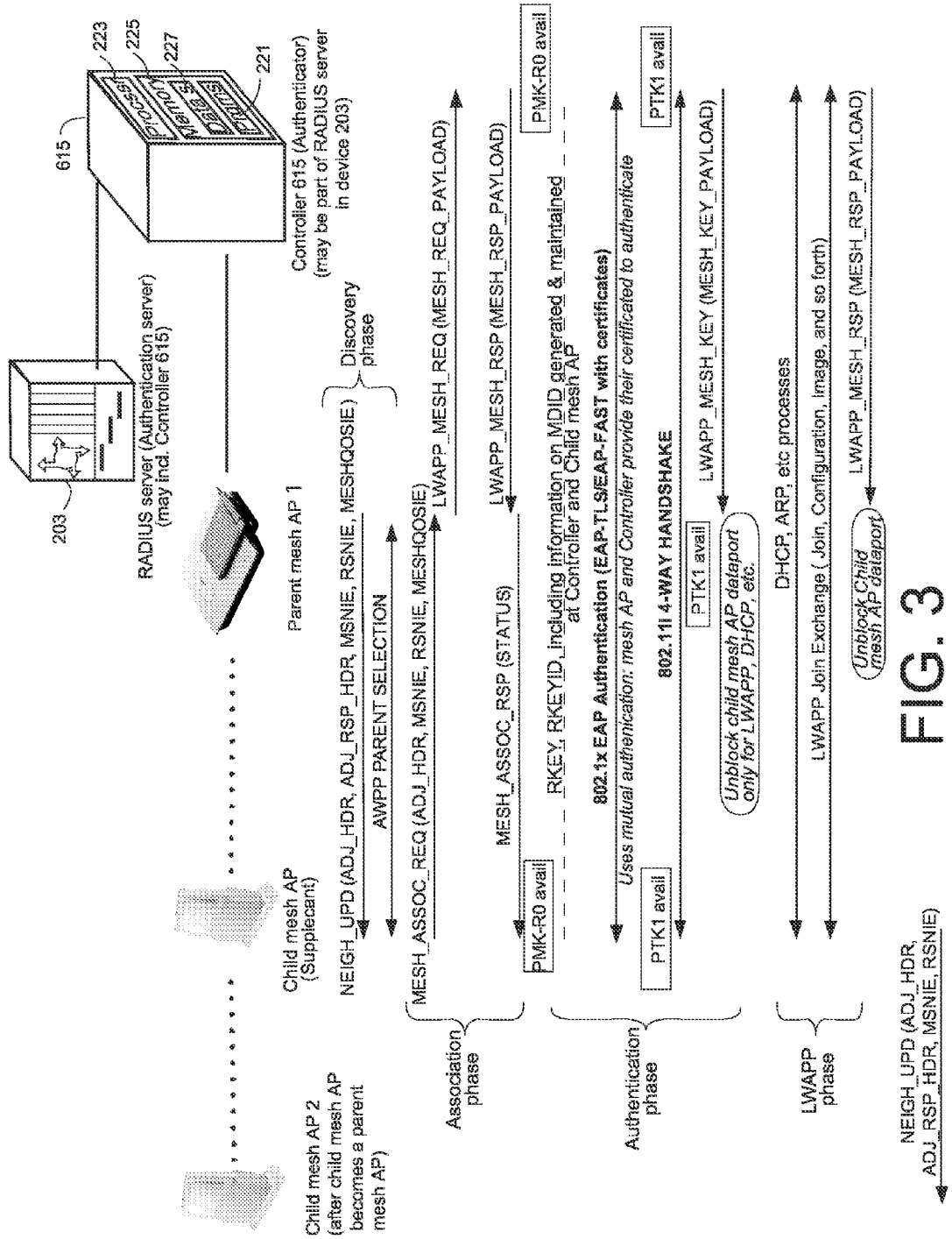
FIG. 3 shows a simple example of mesh AP (root AP-over-Air) Association and Authentication.

FIG. 3 shows an example of a mesh AP authentication process that includes the association phase. The starting point of the process of FIG. 3 is a mesh AP that has a secure LWAPP tunnel to the Authenticator and to the Controller, or that is a root AP connected to the authenticator, and that will be the parent mesh AP to a child wishing to join the mesh network. The authenticator, of course may be the parent mesh AP.

The packet and process flow proceeds as follows:

The discovery phase includes the parent mesh AP advertising its capabilities as a parent by sending in multicast or broadcast a neighbor update NEIGH_UPD (mesh beacon) frame to advertise its abilities. The NEIGH_UPD broadcast includes in ADJ_RSP information related to how to associate with the mesh, and also in MSNIE the mesh network's security profile, e.g., how to generate keys, the type of keys, and so forth. Also included is the robust security network (RSN) information element RSNIE. In one embodiment, an information element providing the quality of service (QoS) of the mesh network, called MESHQOSIE, also in included.

The mesh AP wishing to join the mesh network receives the broadcast advertisement NEIGH_UPD and determines, based on received signal-to-noise ratio, the QoS available, etc., that it would like to join the mesh via this mesh AP, i.e., become a child mesh AP of this parent mesh AP. This is shown as an AWPP parent selection in FIG. 3.

Sending an Association Request to the Parent Mesh AP

The association starts with the child mesh AP so starting the association with the parent mesh AP. It does this by sending a mesh-specific association request MESH_ASSOC_REQ frame (see FIG. 19 and the explanation thereof below) including its security credentials needed to establish link-level security with a parent mesh AP, such a parent mesh AP acting as the pass-through to send the request to the authenticator.

The parent mesh AP received the MESH_ASSOC_REQ, and blocks the child mesh AP's data port to block any wireless client data traffic from the child mesh AP and allows mesh protocol, LWAPP control and 802.1x EAP frames only on the parent mesh AP-child mesh AP link. In one version, the parent mesh AP block any of this wireless client data in general, until the child mesh AP is fully established by the parent mesh AP.

The parent mesh AP acts as the pass-through authentication agent to pass the mesh-specific to the authenticator, which in one embodiment is the Controller 615.

Prior to the parent encoding the child mesh AP's security credentials into a LWAPP mesh request frame (see LWAPP_MESH_REQ in FIG. 22) to pass the child mesh AP's mesh-specific to the Controller via the parent mesh AP's secure tunnel, the parent mesh AP may verify the security policy against its current settings. The child mesh APs security credentials are included in the Robust Security Network information element (RSNIE)—and the Mesh Domain ID (MDID), an identifier for the mesh domain. If the RSNIE or MDID in the MESH_ASSOC_REQ frame does not match the configured parent mesh AP settings, the parent mesh AP may discard the request, increment the appropriate management information base (MIB) counters indicating a failed association by the child mesh AP and coordinate with any intrusion detection system coupled to the mesh wireless network. Such an intrusion detection system, in one embodiment, is managed by the Controller. The intrusion detection system may trigger an event if the MIB counter threshold is reached. In one embodiment, an exclusion data structure is maintained, e.g., by each mesh AP that can act as a parent mesh AP, in a memory, e.g., memory 1317 as part of data structures 1319 (FIG. 13). If a parent mesh AP verifies that the child mesh AP is blacklisted by checking with its exclusion data structure, e.g., of MAC addresses, no further processing is required at this state. The request is discarded, no information is forwarded to the Controller.

The network access server ID (NASID) field of the child mesh AP need not match the parent mesh AP's network access server ID, as it may be a roam, thus this field is best validated by the authenticator/Controller.

Note that one embodiment includes distinguishing first contact from a roam by frame type, e.g., an association frame indicates first contact, whereas a re-association frame indicates roaming, then on first contact, the network access server ID matches the AP's network access server ID.

Note that in embodiments in which the parent mesh AP can determine it is a roam, the parent mesh AP requests the Controller to find the other Controller with the particular network access server ID, if the present Controller is not the parent mesh AP's Controller.

Passing the Mesh-Specific to the Controller

If the child mesh AP is not in the exclusion data structure and otherwise passes the parent mesh AP's security policy, then the parent mesh AP sends the child mesh AP information to the Controller, using a LWAPP_MESH_REQ frame (See FIG. 22) that tells the Controller that there is a child mesh AP that wishes to secure a layer-2 link to the parent mesh AP to join the mesh. The LWAPP_MESH_REQ includes information on the requesting child mesh AP to tell the Controller, such information, e.g., from the MESH_ASSOC_REQ sent by the child mesh AP received at the parent mesh AP. The Controller can now determine whether or not to allow the child mesh AP to secure a layer-2 link to the parent mesh AP to join the mesh to join the mesh.

In one embodiment, the Controller maintains an association table for the mesh network. The association table is in one embodiment maintained in the memory 115 as part of data structures 227. Presuming there is no entry for child mesh AP in the Controller's mesh association table for the mesh network, the Controller validates the request, including: ensuring the RSNIE unicast, multicast ciphers and security capabilities are in adherence to the policy configured for the Controller and the mesh domain, and ensuring the mesh domain ID (MDID) is valid. The Controller also makes sure that an advertised quantity called the network access server ID is either the Controller's ID or the ID of a Controller that is reachable and within the mesh domain with the provided mesh domain ID. Furthermore, an exclusion data structure of blacklisted MAC addresses is maintained by the Controller, e.g., in the memory 115 as part of data structures 227. Validating the request includes ensuring that the MAC address of the requestor is not in the exclusion data structure, e.g., maintained in the Controller.

Invalid Request

If the Controller finds that the request is invalid, it, effectively discards the request. In one embodiment, it furthermore increments an appropriate MIB counter and MAC address for any intrusion detection system coupled to the mesh network, e.g., managed by the authenticator Controller 615, and ensure that the thresholds have not been exceeded; or triggers a blacklisting action for this MAC address. The Controller further composes an LWAPP_MESH_RSP frame (see FIG. 26) with the appropriate "not valid" status report. If intrusion detection system reporting is included, e.g., for blacklisting from Controller to AP, in one embodiment, the appropriate intrusion detection system status report is embedded/encoded in the response LWAPP_MESH_RSP frame.

The Controller sends the negative LWAPP_MESH_RSP frame to the parent mesh AP. Upon receipt of the LWAPP_MESH_RSP frame, if the response is invalid (garbled), the parent mesh AP discards the message and keeps waiting. If the LWAPP_MESH_RSP frame has a status of "request invalid," the parent mesh AP increment an MIB counter for failed Mesh association. No entry is created in the association table, and a mesh-specific association response MESH_ASSOC_RSP frame (see FIG. 21) is constructed with the appropriate status code indicating no association.

Valid Request

If the Controller finds that the request is valid, that is, that the child mesh APs mesh-specific association request was successful, the Controller adds (or updates) the entry in the (mesh) association table the Controller maintains. The Controller further composes a LWAPP mesh response (LWAPP_MESH_RSP) frame with the appropriate positive status report. In one embodiment, for diagnostics, the Controller also checks to see if MIB counters need to be incremented due to the new association.

The Controller sends the positive LWAPP_MESH_RSP frame to the parent mesh AP. Upon receipt of the LWAPP_MESH_RSP frame, the parent mesh AP updates the association status of child mesh AP and replies to the child with a positive MESH_ASSOC_RSP frame back to the child mesh AP.

The parent mesh AP, acting as a pass through, now sends an acknowledgement to the child mesh AP as a mesh association response (MESH_ASSOC_RSP) frame that is a response to the child mesh AP's MESH_ASSOC_REQ.

Once this phase is over, initial association of the child mesh AP is complete and it can now proceed with a complete authentication with the mesh network.

IEEE 802.11 (Layer-2) Authentication Phase

IEEE 802.11 (layer-2) authentication phase of a child mesh AP uses a certificate-based first 4-way handshake and a second 4-way handshake that substantially conform to a standard wireless network authentication process. In one embodiment, these substantially conform to the IEEE 802.11i client authenticating process to authenticate into the network according to the IEEE 802.11 standard. In the case the parent mesh AP is not the authenticator, the parent mesh AP acts as a pass-through to the authenticator. The 4-way handshake is enhanced to ensure the ADJ_HDR, ADJ_UPD_HDR, MSNIE and RSNIE are included in messages 2 and 3 of the 4-way handshake to ensure they are authenticated. The process flow is summarized as follows:

Certificate-Based Authentication 802.1x EAP Authentication)

In one embodiment, the child mesh AP undergoes a certificate-based authentication with the authenticator including a first 4-way handshake authentication with the authenticator so that both the child mesh AP and the authenticator are authenticated to each other. This uses substantially the same mechanism as for EAP authentication as defined by IEEE 802.11i. More explicitly, the authentication is achieved through 802.1x EAP with an authentication server via a parent mesh AP and authenticator using Extensible Authentication Protocol-Flexible Authentication via Secure Tunneling (EAP-FAST). EAP-FAST is a publicly accessible IEEE 802.1x EAP type developed by Cisco Systems, Inc., related to the assignee of the present invention, and available as an IETF informational draft filename "draft-cam-winget-eap-fast-03.txt" as URL http://www.ietf.org/internet-drafts/draft-cam-winget-eap-fast-03.txt. Alternate embodiments use different EAP mechanisms. Both the authenticator and child mesh AP use certificates at least on bootstrap, and potentially on subsequent authentications as well. EAP-FAST may choose to provision the child mesh AP with a PAC to use for subsequent authentications, but that is not a strong requirement; that is, EAP-FAST can be used as standard bi-directional certificate based TLS-style authentication. See "The TLS Standard," IETF RFC 2246 for a description of TLS.

The result of the certificate-based authentication using the first standard 4-way handshake is that the child mesh AP and the authenticator derive Pairwise Master Keys (PMKs) to use.

Note that while in other embodiments, EAP-TLS may be used, the inventors selected EAP-FAST for one embodiment, as it is also a certificate-based mutual authentication method and lays the groundwork for future security enhancements.

If the 802.1x EAP authentication succeeds, the result of the exchange is a pairwise master key, denoted PMK-R0 in FIG. 3 that both the child mesh AP and the authenticator, e.g., the Controller can use to secure all communication between the child mesh AP and all nodes such as the parent mesh AP within the wireless mesh network.

If the 802.1x EAP authentication fails, the Controller tears down the context established for the child mesh AP and increment appropriate counters maintained by the Controller acknowledging a failed mesh authentication attempt. These counters should parallel those already established for standard clients. Similarly, the hooks into the intrusion detection system modules should parallel those already established for standard clients. There should also be a signal to the parent mesh AP of the authentication failure; the parent mesh AP also signals with the equivalent of a disassociation of a failed attempt by the child mesh AP. The parent mesh AP, upon receipt of this failure may also need to increment its counters and teardown whatever state was established for this child mesh AP.

The Second Standard 4-Way Handshake Authentication: 802.11i 4-Way Handshake for Temporary Key Derivation After the certificate-based authentication, e.g., the 802.1x EAP authentication, once both the authenticator, e.g., the Controller and the child mesh AP have a key, PMK-R0, they undergo second standard 4-way handshake authentication. In one embodiment this is a IEEE 802.11i 4-way handshake to determine the key to use between the child mesh AP and other mesh points on a single session.

In one embodiment, the inventors decided to make the handling and triggering of the IEEE 802.11i 4-way handshake substantially the same as that of the IEEE 802.11i standard, using PMK-R0.

The second IEEE 802.11i 4-way handshake's successfully completing results in information such that both the Controller and the child mesh AP can both generate a pairwise transient key denoted PTK1 for the child mesh AP to use with any parent mesh APs acting as pass-throughs, that is, as authentication agents.

Note that unless the parent mesh AP is the authenticator, the parent mesh AP, however, does not yet have PTK1. Because at this stage, the authenticator and Controller can securely communicate via a secure LWAPP tunnel with the parent mesh AP, the authenticator, e.g., Controller sends the key PTK1 to the parent mesh AP using a LWAPP_MESH_KEY frame. This alerts the parent mesh AP that the child mesh AP is acceptable to establish layer-2 connectivity, but not yet OK for full services.

In an embodiment that includes rapid roaming to enable rapid re-association of the child mesh AP with a new parent mesh AP, the Controller also sends the key PTK1 to all potential mesh APs, that is, potential authentication agents using a LWAPP_MESH_KEY frame.

Note that until now, the child mesh AP's data port has been in a blocked state. At this point, the authenticator/Controller further issues a directive for the parent mesh AP to open the child mesh AP's data port for LWAPP control frames, but only for ARP, DHCP, and DNS frames. For maximum security, it is only after the secure LWAPP tunnel is established, i.e., that the LWAPP authentication phase is complete that, in one embodiment, the child mesh AP's port is open for all data. In an alternate embodiment, the port is opened at this stage for all data.

Once this authentication phase is over, child mesh AP and authenticator, e.g., Controller have the pairwise master keys needed for the child mesh AP to communicate with the network during its lifetime. The child mesh AP and parent mesh AP also have the pairwise transient keys PTK1 needed for the child mesh AP to use during a single session via the parent mesh AP.

Thus, IEEE 802.11 data communications may be secured and the LWAPP authentication phase is triggered to form a secure tunnel between the child mesh AP and the Controller.

Note that unlike with the present-case method, the PSK was not necessarily used, and furthermore, standard IEEE 802.1x and 802.11i authentication is used, so that any station knowing the PSK cannot get in. The use of a certificate based authentication provides a secure mechanism for establishing a fresh key for every session compared to using a pre-shared master key or a bridge master key.

LWAPP Authentication Phase: Establishing a Secure LWAPP Tunnel

Though the IEEE 802.11 network is secured in the association and authentication phase, only LWAPP traffic may be forwarded from the parent mesh AP to the Controller to allow the child mesh AP to LWAPP join. The LWAPP authentication phase is similar to that of a regular lightweight AP joining a wireless network, possible without the LWAPP discovery phase, since the parent mesh AP is known. The process flow for joining so that wireless client data also may be passed via a secure tunnel to the Controller is summarized (see FIG. 3) as follows:

As soon as the child mesh AP has mutually derived the pairwise transient key (PTK1) with its parent and it received confirmation that the parent mesh AP has the correct pairwise transient key, the child mesh obtains its IP address, and so forth, as shown as DHCP, ARP, etc processes in FIG. 3. The child mesh AP also may undergo an LWAPP discovery phase to find a Controller to join. Once it finds the Controller, or as it typical, using the Controller it discovered earlier from the mesh beacon frames sent by the parent mesh AP, the child mesh AP initiates an LWAPP join with the Controller. If the Controller of the parent mesh AP refuses to allow with child mesh AP, then the child mesh AP initiates a LWAPP discovery process to find a Controller, starting with a LWAPP_DISCOVERY_REQ frame (see FIG. 30) having a MESH_DISC_PAYLOAD (See FIG. 31). An appropriate (new) Controller responds with a regular LWAPP Discovery Response (as in FIG. 1) and the mesh AP moves to the join phase by sending a LWAPP_JOIN_REQ join request frame. The new (or if the same Controller as the parent mesh AP's) Controller replies with a LWAPP_JOIN_RSP Join Response frame (see FIG. 32) that includes material in MESH_JOIN_PAYLOAD (see FIG. 33).

Note that to support the fast roam aspects of the invention, MESH_JOIN_PAYLOAD includes material that provides for fast LWAPP session roaming. In particular, the very first time the child mesh AP joins, it alerts the Controller that it is enabled to do fast LWAPP session roaming.

A LWAPP_MESH_RSP frame is sent to let the parent mesh AP know that the child mesh AP is OK to join the mesh network with this Controller.

Until now, in one embodiment the parent mesh AP acting as authentication agent cannot pass any client or backhaul traffic from the child mesh AP. Until this point, the child mesh AP cannot become the parent of any new mesh AP wishing to join the wireless mesh network, and further cannot accept any client station as the client station's AP.

The Controller via the parent mesh AP now sends a directive to the parent mesh AP to open the filtering data port of the child mesh AP, so that wireless client data is passed on to the Controller.

At the end of this phase, the child mesh AP may pass wireless client data traffic for its clients as well as become the parent mesh AP to other mesh APs. Thus, the child mesh AP has joined the mesh network, has a secure LWAPP tunnel to the Controller, and does, for example, broadcast NEIGH_UPD (mesh beacon) frames to indicate it is now available as a parent mesh AP. The new child mesh AP also has the LKEY for the secure LWAPP tunnel to the Controller.

Layer-2 (IEEE 802.11) Mesh Re-Association: Roaming

A mesh node may change its parent mesh node naturally due to AWPP or when the RF/network condition changes. One aspect of the invention is an efficient re-association mechanism for mesh APs to be able to fast roam or converge quickly under roams/parent changes, e.g., those induced by the Adaptive Wireless Path Protocol (AWPP) routing protocol describe above and in FIGS. 7 to 11. Child mesh AP re-authentication occurs using a re-association style for mesh networks, using a mechanism that is similar to the process described in the soon-to-be established IEEE 802.11 standard mechanism for fast roaming, the IEEE 802.11r proposed standard, referred to herein as TG-r, based on the Mar. 1, 2006 draft. A copy of the Mar. 1, 2006 draft is included in U.S. Provisional Patent Application Ser. No. 60/779,891, incorporated herein by reference. Note that while some of the details of the TG-r process may change as the standard develops, the aspects as described herein are expected to be common. Thus, by TG-r layer-2 fast roaming is meant the process substantially as described herein for providing fast layer-2 (IEEE) re-authentication so that a secure layer-2 link is established from a child mesh AP to the new parent mesh AP without requiring either a full backend authentication or a 4-way handshake.

Leveraging the TG-r fast transition base mechanism only, mesh nodes can optimize the establishment of a new and fresh PTK security context with a subsequent parent mesh node through the use of a key hierarchy as described below. The notation and description are those as defined by the TG-r Draft 2.1

The key hierarchy is established to enable key separation and effective sharing of a single session authentication across the edge of the network or, in the context described herein, the mesh fabric. That is, the MSK or PMK-R0 is effectively shared across the mesh nodes, while allowing each node to a have unique value to be used—derived from the PMK-R0 in one embodiment. Thus, when a mesh node carries out authentication into an existing mesh network, it establishes a PMK-R0 from which it can then derive unique keys for each R1-key holder and in turn, for each BSSID.

The key hierarchy is MSK→PMK-R0→PMK-R1 as follows:

MSK
    MSK: explicitly derived by successful EAP-FAST.
PMK-R0
    PMK-R0=KDF-256(MSK, "R0 Key Derivation", SSIDlength||SSID||MDID||R0KH-ID||0x00||IS)
    PMKR0Name=Truncate-128(SHA-256("R0 Key Name"||SSIDlength||SSID||MDIF||R0KH-ID||0x00||IS||ANONCE))
PMK-R1
    PMK-R1=KDF-256(PMK-R0, "R1 Key Derivation", PMKR0Name||R1KH-ID||0x00||IS)
    PMKR1Name=Truncate-128(SHA-256("R1 Key Name"||PMKR0Name||R1KH-ID||0x00||IS))
PTK
    PTK=KDF-PTKLen(PMK-R1, "PTK Key Derivation", SNONCE||ANONCE||R0KH-ID||R1KH-ID||BSSID||IS).

where KDF is the key derivation function KDF-Length described below and in the TG-r draft. The identifiers as mapped into the mesh topology is defined as follows:

MDID defines the mesh domain or group.
    R0KH-ID is the Controller's identity, or more specifically, the network access identifier (NAS-Identifier) as presented to the AAA server when the Controller initiated the Access Request on behalf of the child mesh nodes.
    R1KH-ID is the Controller (or AP's) identity, or more specifically, the device identifier, which could be a NAS-Identifier, that affects the 4-way handshake or TG-r-base mechanism to establish the PTK.
    IS is the child mesh node's MAC address.
    BSSID is the parent mesh node's MAC address.

TG-r Key Derivation Function

The function used for deriving all keys in the TG-r key hierarchy is defined in the TG-r draft and summarized below:

Output=KDF-Length(K, Label, Context) where the inputs are:
K: a 256 bit key derivation key.
Label: a string identifying the purpose of the keys derived using this function.
Context←a bit string that provides context to identify the derived key.
Length←the length of the derived key in bits.
The output Output is a Length-bit derived key
result=" "
iterations=(Length+255)/256
do i=1 to iterations
   result=result||HMAC-SHA256(K,
      I||Label||0x00||Context||Length)
od
return first Length bits of result and securely delete all unused bits PTK Partitioning:
The length of the PTK depends on the chosen cipher suite:
TKIP PTK length=640,
where
KCK=PTK[0:127]
KEK=PTK[128:255]
TK=PTK[256:511]
RKEY=PTK[512:639]
AES PTK length=512,
where
KCK=PTK[0:127]
KEK=PTK[128:255]
TK=PTK[256:383]
RKEY=PTK[384:511]

Figure 4:
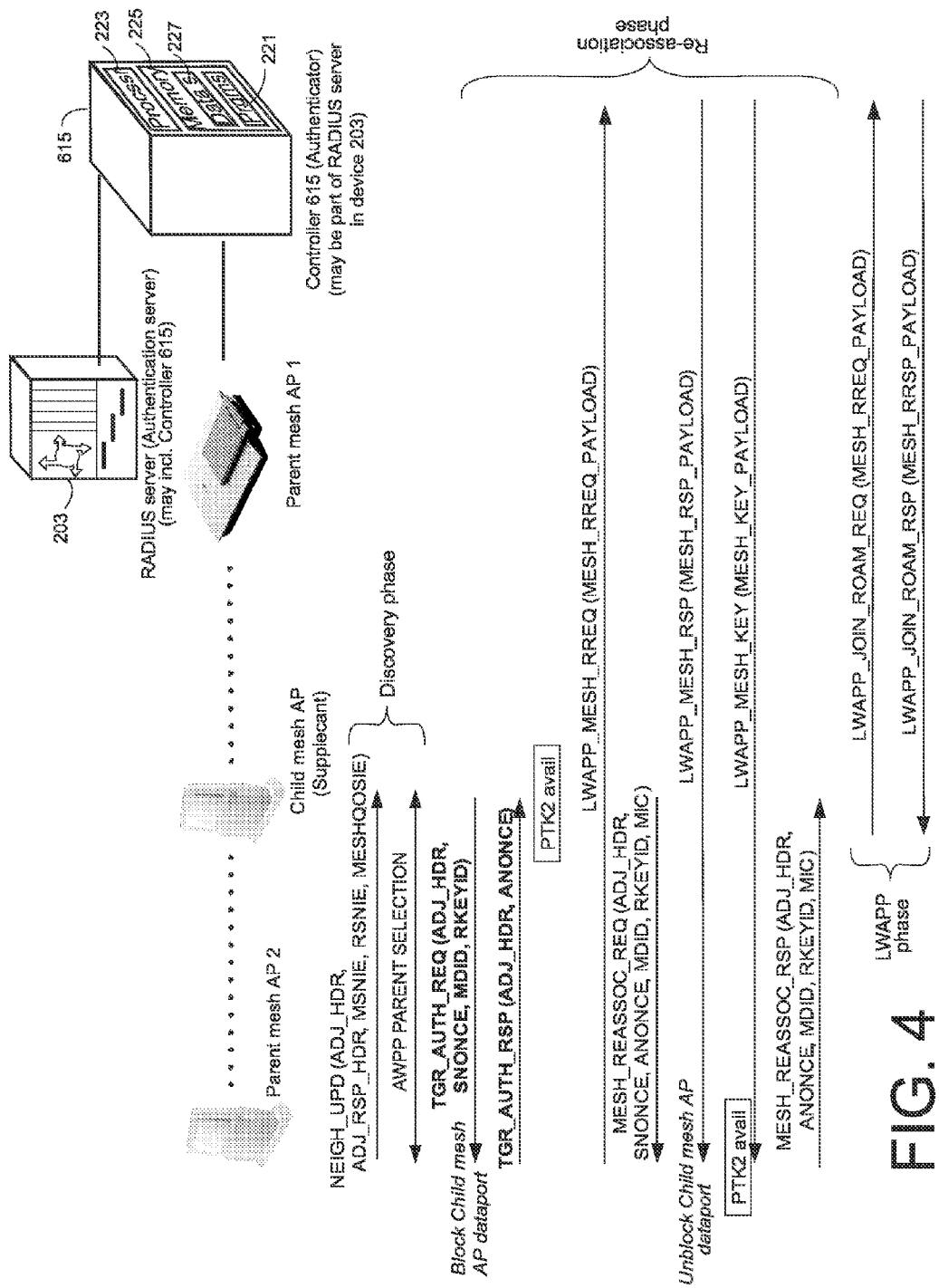
FIG. 4 shows Mesh AP Association and Re-association based on roaming, according to a variation of the soon-to-be established IEEE 802.11 standard mechanism for fast roaming, the IEEE 802.11r proposed standard, referred to herein as TG-r.

The layer-2 (IEEE 802.11) re-authentication process is now explained with the help of FIG. 4. While some aspects of the process shown in FIG. 4 are prior art, other aspects are not prior art, so the drawing is NOT marked "Prior Art." Note that aspects of the processing of the messages are identical to the authentication phase, however with some exceptions.

The most rapid transitioning only hold within the same MDID. That is, a mesh node roaming from one MDID to a different MDID must consider this a new association and session and thus a full IEEE 802.11 mesh association and LWAPP join sequence must be applied.

The start of the process shown in FIG. 4 is assumed to be after the process shown in FIG. 3 of association of a new child mesh AP to an existing mesh AP to act as a new parent mesh AP. Suppose the method of FIG. 3 provided a link between the child mesh AP and a first parent AP, denoted parent mesh AP 1. Suppose that the child mesh AP now roams. What will be described is a roam to a new parent mesh AP 2 which has a secure connection to the same Controller (or at least to the same mesh domain having the same mesh domain ID, MDID) as the parent mesh AP 1.

In the embodiment in which fast roaming is enabled, in the process described in FIG. 3, when PMK-R0 is generated, in one embodiment, a key called a roam key (RKEY) and identified by a roam key ID (RKEYID) is generated and maintained at both the Controller and the child mesh AP. The RKEY includes information on the mesh domain ID (MDID). The distinction of the controller identifies as based on the advertisement of the Controller identifiers in the parent mesh beacons, noted above as the R0KH-ID.

Note that mesh beacons contain a mesh node capabilities, which must include "Fast Roaming" before the mesh node initiates this process. If a parent mesh node does not support "Fast Roaming", the mesh node must fallback and do a full first-contact association and authentication with this parent node. Furthermore, the beacons must also include its MDID and Controller identifier R0KH-ID One aspect of the invention is that a mesh AP that has fast roaming enabled advertises such fast roaming capability in each NEIGH_UPD (mesh beacon) frame that is broadcast to advertise a mesh AP's capabilities. The NEIGH_UPD (mesh beacon) frame includes in its ADJ_HDR (see below and FIG. 15) an indication that it has roaming capabilities. The mesh beacon frames provide information sufficient for a receiving mesh AP to ascertain whether fast roaming is possible to the mesh AP that transmitted the mesh beacon frames. The mesh security network information element MSNIE (See below and FIG. 17) includes the Mesh Domain ID denoted MDID of the mesh domain is it attached to. Any mesh AP that has the same MDID in the MSNIE can accept a roam to the same Controller. Note that the MESH_ASSOC_REQ frame (see below and FIG. 19) also includes the ADJ_HDR with the indication of fast roaming support. Thus, taking the mobility domain identifier as an example, for a fast roam to a mesh AP transmitting mesh beacons, the mesh domain ID has to be the same as for a previous parent to tell the child that both parents are part of the same mobility domain.

Thus, suppose a child mesh AP received the NEIGH_UPD mesh beacon from a parent mesh AP, say Parent mesh AP 2, and decides to roam to the Controller via this new parent mesh AP 2, based on information such as the received signal-to-noise ratio and the QoS available. The discovery phase includes AWPP routing to join the mesh network. This is shown as AWPP parent selection in FIG. 4.

An exchange is now started by the child mesh AP sending a re-authentication request frame to the parent mesh AP 2. The re-authentication frame is the TGR_AUTH_REQ frame of FIG. 34 together with a NONCE, denoted SNONCE since the child is the supplicant, for the parent to use for encryption, with the Mesh Domain ID (MDID) and with the roam key RKEYID in one embodiment, and PMK-R0 name in another embodiment, to let the parent mesh AP 2 knows that this child is already in session with the Controller, providing also the identity of the Controller, and request information for generating a key to use for parent-child communication.

The parent mesh AP 2 receives the TGR-AUTH_REQ, blocks the child mesh
AP's data port for wireless client data, and sends back to the child mesh AP, using the received SNONCE, a re-authentication response frame, TGR_AUTH_RESP (see FIG. 35) to provide its NONCE, denoted ANONCE, for the child mesh AP to use for forming a PTK key, and echoing the SNONCE, PMKR0Name and MDID. At this point, the child mesh AP can generate a pairwise transient key for communicating with the new parent mesh AP. Denote this key by PTK2.

The parent mesh AP 2 also sends the Controller 615 an LWAPP mesh roam request (LWAPP_MESH_RREQ) frame, or course protected by the LWAPP key used for securing the tunnel between the Controller and parent mesh AP 2, and with a payload MESH_RREQ_PAYLOAD to indicate to the Controller that there is a child mesh AP wishing to join via a roam. The payload includes for that child ID the roam key RKEYID, the SNONCE and the ANONCE, so that the Controller too can ensure that the potential child mesh node is indeed authentic and authorized, and also requesting the PTK, PTK2 be generated. This in essence says to the Controller—here's a child; is this child mesh AP OK to (re)join the mesh, and if so, please give me a key for communicating with this child mesh AP.

If the Controller is to accept the child mesh AP to re-establish an existing LWAPP session using the LWAPP key, that is, for example, if the new parent mesh node and the child mesh node share the same controller, the controller in one embodiment preserve the LWAPP session, (and may buffer all frames for it), being aware that the child mesh node is roaming. The controller furthermore generates the next PTK, denoted PTK2 for the child and parent to communicate using the SNONCE and ANONCE, etc., and the Controller responds to parent mesh AP 2 with an LWAPP_MESH_RSP with a payload MESH_RSP_PAYLOAD that indicates that it is acceptable for this child mesh AP to re-establish with this Controller. The Controller 615 also transmits a second response, a LWAPP_MESH_KEY frame that includes the PTK2 for the parent mesh AP to use.

Upon parent mesh AP 2 receiving the LWAPP_MESH_RSP, it unblocks the child mesh AP's data port for wireless client data.

Note that the child mesh AP also has the information needed to calculate PTK2. So now, at around the same time, once the child mesh AP has PTK2, e.g., has calculated the PTK2 key, it sends a MESH_REASSOC_REQ to parent mesh AP 2 to re-establish the connection using PTK2. The data in MESH_REASSOC_REQ is signed using a roaming message integrity check (MIC) for signing to provide proof of integrity to the receiving parent mesh AP.

At this stage both the parent mesh AP 2 and the child mesh AP have PTK2. Upon confirming the MIC and after PTK2 arrives at parent mesh AP2 from the Controller, the parent mesh AP 2 sends the child mesh AP a message MESH_REASSOC_RSP using the MIC to indicate that the correct key PTK2 has arrived. In one embodiment, the message contents are signed with a MIC providing such proof.

Now secure communication can occur between the child mesh AP and the parent mesh AP 2 to which the child has roamed. Furthermore, prior and after the roam, secure communication could occur from parent mesh AP 2 to the Controller, so that now there is secure communication between the child mesh AP and the Controller, of course via the parent mesh AP 2. The child mesh AP can for example, notify the Controller about its new parent mesh AP. Note no secure tunnel between the Controller and the child mesh AP has yet been formed.

For more details on IEEE TG-r draft specification, see the IEEE 802.11r: Fast BSS Transition, IEEE-PIEEE 802.11r/D1.0-November, 2005, Draft proposal, IEEE 802.11 working Group R.

Thus, as shown in FIG. 4 and described above, a secure layer-2 (IEEE 802.11) link can be established from a child mesh AP to a new parent mesh AP without requiring a full backend (EAP) authentication and without requiring a full backend (EAP) 4-way handshake.

LWAPP Roam: Rapidly Re-Establishing a Secure LWAPP Tunnel

Another aspect of the invention provides for signaling to allow a previously established secure LWAPP tunnel (the secure tunnel) to be re-established with minimal disruption and relatively rapidly. With this aspect, LWAPP sessions may be updated after a mesh node looses its controller connection either because its layer-2 802.11 link was lost or because there was some latency exceeding a predefined Controller timeout period when it transitioned to a new parent mesh node. Under these scenarios, the mesh node still holds a valid session identifier (SID), and thus a valid tunnel with the Controller and may resume under appropriate conditions.

The LWAPP session roam aspect described herein can be used as a general mechanism for resuming LWAPP session without having to re-establish a new session or tunnel, and thus reduces the number of cryptographic operations and state machine sequencing.

When a child mesh AP roams, there must be signaling to allow both the 802.11 link and the secure LWAPP tunnel to be re-established with minimal disruption. The top part of FIG. 4 and the Section directly above describes how the secured IEEE 802.11 link is transitioned from the current parent mesh AP 1 to a new parent mesh AP 2. Such re-establishing of a tunnel might be desirable, for example, in the case that the authorization such as the access control changes as a client moves from one AP to the other. This section describes how the secured LWAPP session may also be retained with appropriate signaling.

This aspect of the invention includes incorporates a LWAPP session resumption mechanism into wireless mesh security. The inventors recognize that there is advantage in using tried and true mechanisms, so the incorporated mechanism is similar to the session resumption mechanisms of the TLS standard (TLS Standard, IETF RFC 2246).

In the TG-r roaming described above, when a connection is established by resuming a session, in one embodiment, there are hashed the LWAPP session ID with the random values SNONCE and ANONCE as provided as a result of the IEEE 802.11 (layer-2) link-level roam between the parent and child and the sessions ID. Provided that the session ID is still alive, and that the secure hash operations used to produce the encryption keys are secure, the connection should be secure and effectively independent from previous connections. Attackers cannot break in using known encryption keys.

One embodiment of the process is summarized as follows:

On initial contact, during the initial LWAPP join to form the secure LWAPP tunnel (see FIG. 3 and the description above), the session ID (SID) is cached by both the Controller and the child mesh AP. The child mesh AP also caches the LWAPP key and identifier for the Controller.

Furthermore, in the process shown in FIG. 4, when the Controller receives the LWAPP_MESH_RREQ, the Controller caches the LWAPP session and the LWAPP key. In some embodiment, the Controller also caches frames for the cached session.

The start of the process shown in FIG. 4 is assumed to be after the process shown in FIG. 3 of association of a new child mesh AP to an existing mesh AP to act as a new parent mesh AP, so that in addition the layer-2 secure links that existed between the first parent mesh AP 1 and the child mesh AP, the first and second parent mesh APs have established secure LWAPP tunnels, i.e., are each in secure tunnel communication with a Controller, and that the child mesh AP was not only in secure layer-2 communication with the first parent mesh AP 1, but had secure tunnel to the Controller via the first parent mesh AP 1. Suppose that it was the method of FIG. 3 that provided a layer-2 link between the child mesh AP and a first parent AP, denoted parent mesh AP 1, and an LWAPP secure tunnel between child mesh AP and the Controller. Suppose that the child mesh AP now roams. What will be described is a roam to a new parent mesh AP 2 which has a secure connection to the same Controller as the parent mesh AP 1.

On initial contact of the child mesh AP with the mesh, e.g., via child mesh AP 1, the LWAPP keying material (LKEY) used to secure the LWAPP messages in the secure LWAPP tunnel between the child mesh AP and the Controller is available to both the Controller and the Child mesh AP, and is as defined by the existing LWAPP mesh security protocol (see, e.g., FIG. 3). As described above, additionally, when the secure tunnel is first established for the child mesh AP, e.g., as in FIG. 3, a roam key, denoted RKEY, is generated by the Controller and distributed to the child mesh AP, and maintained by both the Controller and child mesh AP. The roam key is used to prove liveness of the session identified by the SID. In one embodiment, the RKEY is 256 bits in length and used for both authenticating the Join roam exchange and for wrapping a new LWAPP key.

Suppose the child mesh AP has successfully secured the layer-2 (IEEE 802.11) link to the new parent mesh AP 2 using the re-association mechanism described above and in FIG. 4. According to an aspect of the present invention, the child mesh proceeds with the LWAPP Mesh join for roaming to re-establish a secure LWAPP tunnel. It is presumed at this state that the child mesh AP does not need to do a discovery, but merely reaffirm and refresh the LWAPP key that it has previously established for its secure LWAPP tunnel when a child to parent mesh AP 1. To achieve this roaming to the new parent, an LWAPP roaming exchange shown as the last two messages in FIG. 4 is carried out. The child mesh AP issues an LWAPP join request frame which in the roam case is a LWAPP_JOIN_ROAM_REQ (see FIG. 40 and the description below) with LWAPP_HDR, LWAPP_CNTRL_HDR, JOIN_REQ_ELEMENTS, new elements MESH_RREQ_PAYLOAD reiterating the session ID (SID) as provided during the initial contact, and a new random value, LNONCE. Unlike the case when the child mesh AP first sends a join request using a certificate to establish a new session (see FIG. 1 and the description above), in the roam a certificate is, in one embodiment, omitted from the join request which in the roam case uses a LWAPP_JOIN_ROAM_REQ frame. Rather, a message integrity check (MIC) is included, called the roaming message integrity check (MIC) for signing in order to authenticate the LWAPP join request frame. In one embodiment, the MIC uses the most significant 128-bits of the RKEY as described above. Thus, in one embodiment, the LWAPP join request frame appends a roaming MIC whose value is computer as follows:

roaming MIC=HMAC-SHA256(128-MSBits-of-RKEY, LWAPP_JOIN_ROAM_REQ)

where LWAPP_JOIN_ROAM_REQ includes the appropriate signaling to state that it is a roam request (vs. a new join) and the SID and LNONCE.

The Controller receives the LWAPP_JOIN_ROAM_REQ frame and validates the join request by ensuring all values in the LWAPP join roam request frame are valid and the MIC is valid as well. If this process fails, the controller collapses the tunnel and send the parent mesh node a failed LWAPP mesh roam response frame (LWAPP_JOIN_ROAM_RSP).

If the Controller validates the LWAPP Mesh Join (roam) request, in one embodiment, a new LWAPP key and RKEY are generated, while in another embodiment, the same LWAPP key is used. The 128 least significant bits of the RKEY is used to—both the new LWAPP key and the RKEY. The Controller 615 responds with a LWAPP_JOIN_ROAM_RSP frame agreeing to accept the re-joining of the child mesh AP. The payload MESH_RRSP_PAYLOAD is shown in FIG. 42, and described below. LKEY2 is in one embodiment a new key, and in some embodiments, the same as LKEY.

Note that while one embodiment includes the RKEY and RKEY ID in the MESH_RRSP_PAYLOAD, another embodiment does not.

The LWAPP mesh response frame is sent to the parent mesh node to signal to the parent when the child has successfully joined the controller and thus it can begin to forward the child's data traffic to the parent. If the parent mesh node does not receive such a packet, or receives a LWAPP mesh response frame with a failed status, it disassociates the child mesh node.

Thus, the tunnel between the child mesh AP and the Controller, with the session ID SED, is restarted but now via parent mesh AP 2, without having to do the complete LWAPP discover exchange and LWAPP join exchange as needed in the non-roam case shown in FIGS. 1 and 3.

Key Management

Another aspect of the invention is management of the keys used for establishing and for re-establishing, e.g., when roaming, keys for use for security. Key management functions include key initialization and key refresh.

Key refresh is triggered by the Authenticator, e.g., the Controller), or the parent mesh AP using LWAPP. The following parameters are needed for implementing key management functions.

For the pairwise master key (PMK), a lifetime, called PMK_lifetime is provided by the authentication server or configurable on the authenticator, e.g., the Controller 615. In one embodiment there an Authenticator-based "re-authentication time" time denoted PMK_reauth_time is defined, and configured to have a default value, which is 1 day in one embodiment, and can be different in other embodiments.

For the pairwise transient key (PTK), a lifetime, called PTK lifetime is less than or equal to PMK_lifetime.

In one embodiment there is an Authenticator-based PTK lifetime configured or defaulting to the PMK_lifetime.

In one embodiment, the general rules for key refresh are:
Condition (1): When (PMK_lifetime−PMK_reauth_time) =0, carry out a new EAP authentication, where PMK_reauth_time is a re-authentication time for the PMK.
Condition (2): When (PTK lifetime−PTK_reauth_time) =0, carry out a IEEE 802.11i handshake, where PTK_reauth_time is a re-authentication time for the PMK.

In one embodiment, the Controller 615 sends an unsolicited LWAPP_MESH_RSP frame to the parent mesh AP with the "Port Status" set to 00 (blocked) for Condition (1), and set to 01 for Condition (2) to allow IEEE 802.11 data/EAP frames. The parent mesh AP triggers the appropriate 802.1x EAP-Request or IEEE 802.11i handshake first message as necessary.

Key Management in Mesh APs

An alternate embodiment includes IEEE 802.11i key management in mesh APs rather than in the Controller. This has the advantage over implementing both 802.1x authenticator and key management in the Controller in that the IEEE 802.11i handshake can now occur between child mesh AP-parent mesh AP pairs. The only thing that is needed to be done is to derive the next master key in the hierarchy, denoted PMK-R1, and push that down from the Controller to the parent mesh AP using a key distribution frame after the 802.1x authentication completes, instead of pushing down the pairwise transient keys.

Such key management carried out in mesh APs has particular advantage for deep mesh networks where the deeper the mesh APs are from the Controller, the longer the latency would be for an IEEE 802.11i handshake between a child mesh AP and the Controller.

Multi-Controller Scenarios

As there is no 1-1 correspondence between the mesh APs and the Controller to which they attach. A single mesh sector may have its members connected to different Controllers in the same mobility/RF domain. This has implications on the design in that if during a roam, the new parent mesh AP is attached to a different Controller than the child mesh AP, then all of parent mesh AP's frames that are used for authenticating child mesh AP go through the parent mesh AP's Controller. Supposing the parent mesh AP is connected to Controller-1 and child mesh AP is connected to Controller-2, the following steps occur:

1) The parent mesh AP forwards all auth frames to the Controller-1.
2) Controller-1 brings child mesh AP key contexts from Controller-2 using LWAPP mobility/RF domain protocol and re-validates child mesh AP.
3) Controller-1 forwards PTK2 to the parent mesh AP.
4) The child mesh AP generates PTK2 from the parent mesh AP's MESH_ASSOC_RSP frame.
5) The parent mesh AP and child mesh AP can start exchanging frames using PTK2.

Controllers in the same mobility/RF domain are L2 or L3 reachable (depending on network configuration). Hence, once the re-authentication is complete, the child mesh AP and its clients continue being served by Controller-2 and parent mesh AP and its clients continue being served by Controller-1.

If different Controllers are not in the same mobility/RF domain, the above method does not work and a full 802.1x/IEEE 802.11i authentication is needed. In general as NEIGH_UPD (mesh beacon) frames include the mobility/RF domain (MDID), a child mesh AP should attempt to connect to the parent mesh APs with matching MDID. As a single MDID corresponds to a single administrative domains, a network administrator should configure all Controllers expected to service a multi-sector, mesh domain to be in the same mobility/RF domain.

Protocol Specifications—Basic Protocol Frame Structures

Aspects of the frame structures shown, and the associated methods leverage tried-and-true 802.1x EAP and IEEE 802.11i security standards. None of the existing 802.1x and IEEE 802.11i mechanisms is substantially changed. Appropriate mesh hooks are added on the Authenticator side in order to distinguish between a regular IEEE 802.11 client and a mesh AP.

The inventors have chosen as the over-the-air protocol frame structures forms that adhere to IEEE 802.11i and IEEE 802.11r standards as much as possible. Of course, in alternate embodiments, other frame structures that carry the required information may be used.

FIGS. 14-33 depict and describe the frames or frame parts used in one embodiment for authentication and other aspects as described herein. Note that appropriate IEEE 802.11 frame headers are attached on the shown frame structures in order to send them over the air. Such headers are not shown, and those in the art will understand how such headers are attached. The lengths shown are in bytes (octets). For example, 2B in any of the drawings denotes 2 bytes.

NEIGH_UPD: FIG. 14 shows a frame/frame part denoted NEIGH_UPD (mesh beacon) frame, where parameters have the following meanings:

ADJ_HDR: Common header used by AWPP for mesh backhaul routing.

ADJ_UPD_HDR: These are various elements used by AWPP (not related to security).

MSNIE: Mesh Security Network IE.

RSNIE: Robust Security Network IE.

ADJ_HDR: FIG. 15 shows a frame/frame part denoted ADJ_HDR, where parameters have the following meanings:

CHANNEL: The current channel this frame is being transmitted on.

ANTENNA: The current antenna this frame is being transmitted on.

SNR: A measure of link quality from the source node.

PARENT_MAC: The physical address of the parent of this node.

DST_MAC: The physical address of the destination node for this frame.

FLAGS: Flags in order to indicate role of the AP in the network and other purposes as per Table 2 as follows:

TABLE 2

ADJ_HDR Flags Definitions

| Status Code | Meaning |
| --- | --- |
| bit0-1 | AP Role.<br>00: Unknown.<br>01: Parent Only, e.g. root AP.<br>10: Parent and Child, e.g. parent mesh AP.<br>11: Child Only, e.g. child mesh AP with no child |
| bit2 | TG-r Roaming |
| bit3-7 | Reserved |

ADJ_UPD_HDR: FIG. 16 shows a frame/frame part denoted ADJ_UPD_HDR where parameters have the following meanings:

TYPE: Frame type set to ADJ_UPDATE and Version to 2.0.

SNR: A measure of link quality from the node a request would come in (set to 0).

ERROR: Not used.

NUM_ROUTES: Not used.

ANTENNA: The antenna the requesting node had sent it on (set to 0).

CHANNEL: The channel the requesting node had sent it on (set to 0).

CHILD_ADDR: The destination child node (broadcast in this case).

NET_NAME: The bridge group name "bridgegroupname" used in some legacy systems. This is left here for legacy support and not used in the implementation described herein.

Note: As beacon and probe response frames are quite similar, NEIGH_UPD and NEIGH_RSP frames were originally designed to be close. There are some elements copied from the NEIGH_REQ by AWPP, which are set to 0 and not used in NEIGH_UPD (mesh beacon) frames.

MSNIE: FIG. 17 shows a frame part (an information element (IE)) denoted MSNIE, the Mesh Security Network information element, where parameters have the following meanings:

TYPE: A type code.

LENGTH: Length of this element starting from VERSION.

VERSION: For this embodiment, the first version, this is set to 1.

MDID: Mesh Domain ID (the replacement for "bridgegroupname"), a string up to 12 bytes in size.

Network access server ID: The network access server ID, the Controller MAC address at this time. This is R0KH-ID described above.

RSNIE: FIG. 18 shows an information element denoted RSNIE, the Robust Security Network (RSN) information element. In this embodiment, RSNIE is an exact mimic of the RSN IE defined in Section 7.3.2.25 of the published IEEE 802.1i standard. Thus, the RSNIE is consistent with the 802.11i and its assignments can be the same. In this context, the RSNIE defines the security policies for the mesh link. Parameters have the following meanings:

TYPE is 30HEX.

VERSION: the version number of the protocol.

GROUP CIPHER Suite field contains the cipher suite selector used to protect broadcast/multicast traffic. For mesh networks as used herein, only one group cipher suite is supported, e.g., CCMP.

PAIRWISE_CIPHER_SUITE_COUNT field indicates the number of pairwise cipher suite selectors that are contained in the PAIRWISE_CIPHER_SUITE_LIST field.

The PAIRWISE_CIPHER_SUITE_LIST field contains a series of cipher suite selectors that indicate the pairwise cipher suites contained in the RSN information element.

The suite selector includes an organizational unique identifier (OUI) and a 1-byte SUITE TYPE. Different OUIs are used for different types of cipher.

For mesh networks as used herein, only one pairwise cipher suite is supported, e.g., CCMP.

The AKM_SUITE_COUNT field indicates the number of AKM suite selectors that are contained in the AKM_SUITE_LIST field.

The AKM_SUITE_LIST field contains a series of AKM suite selectors contained in the RSN information element.

RSN_CAPABILITIES indicates requested or advertised capabilities.

The PMKID_COUNT and PMKID_LIST fields are used, e.g., for PMK caching. In the mesh version described herein, there is no support for PMK caching, hence, e.g., PMKID_COUNT is set to 0.

Those in the art can find details on RSNIE and its various elements in Section 7.3.2.25 of the published and readily available IEEE 802.1i standard (IEEE-Std IEEE 802.11i-2004).

MESH_ASSOC_REQ: FIG. 19 shows a frame/frame part denoted MESH_ASSOC_REQ, where parameters have the following meanings:

ADJ_HDR: Common header used by AWPP for mesh backhaul routing with Frame-type set to ADJ_ASSOC_REQ, a pre-defined unique type value, and Version to 2.0.

MSNIE: the Mesh Security Network information element (IE) as shown in FIG. 17 and the above description of parameters of MSNIE.

RSNIE: The Robust Security Network (RSN) information element, same as defined in FIG. 18 and the above description of its parameters, and also in the 802.11i standard.

MESHQOSIE: Quality of Service (QoS) IE.

All of ADJ_HDR, MSNIE and RSNIE are same as in FIG. 14 describing NEIGH_UPD and the above description of parameters of NEIGH_UPD. MSNIE and RSNIE is copied from the NEIGH_UPD as heard by the mesh AP sending the MESH_ASSOC_REQ.

MESHQOSIE: FIG. 20 shows a frame part (an information element) denoted MESHQOSIE, where parameters have the following meanings:

TYPE: A pre-assigned unique type value.

LENGTH: Length of this element starting from VERSION.

VERSION: In one implementation Version set to 1, indicating this is the first version. Of course, later versions likely will have different values for VERSION.

QOS_CAPABILITIES: Should include what kinds of backhaul QoS capabilities this mesh AP can provide.

MESH_ASSOC_RSP: FIG. 21 shows a frame/frame part denoted MESH_ASSOC_RSP, where parameters have the following meanings:

ADJ_HDR is the same as in FIG. 14 describing NEIGH_UPD and the above description of parameters of NEI-GH_UPD, with Frame-type set to ADJ_ASSOC_RSP, a pre-defined unique type value, and Version to 2.0.

STATUS: Status is encoded according to Table 3 below.

TABLE 3

MESH_ASSOC_RSP Status Codes

| Status Code | Meaning |
| --- | --- |
| 0 | Association Successful |
| 1 | Association failure |
| 2 | Association unknown |
| 3-63 | Reserved |

LWAPP_MESH_REQ: FIG. 22 shows a frame/frame part denoted LWAPP_MESH_REQ, where parameters have the following meanings:

LWAPP_HDR: LWAPP transport header as defined in described in the LWAPP specification per Version 3 of the draft "Lightweight Access Point Protocol," IETF capwap Working Group, called "draft-ohara-capwap-lwapp-03.txt," available at <www3.ietf.org/proceedings/05nov/IDs/draft-ohara-capwap-lwapp-03.txt>, and incorporated herein by reference. See also FIG. 23.

LWAPP_CNTRL_HDR: LWAPP control message header as defined in the above-mentioned LWAPP specification "draft-ohara-capwap-lwapp-03.txt."

MESH_REQ_PAYLOAD: The payload containing necessary association context of the Supplicant mesh AP.

LWAPP_HDR: FIG. 23 shows a frame part denoted LWAPP_HDR, where parameters have the following meanings:

LWAPP_HDR elements are exactly as described in Section 3.1 of the published LWAPP specification "draft-ohara-capwap-lwapp-03.txt," incorporated herein by reference.

LWAPP_CNTRL_HDR: FIG. 24 shows a frame part denoted LWAPP_CNTRL_HDR, where parameters have the following meanings:

LWAPP_CNTRL_HDR elements are exactly as described in Section 3.1 of the above-mentioned LWAPP specification "draft-ohara-capwap-lwapp-03.txt." MSG_TYPE should be set to MSG_MESH_REQUEST, a pre-defined unique type value.

MESH_REQ_PAYLOAD: FIG. 25 shows a frame/frame part denoted MESH_REQ_PAYLOAD, where parameters have the following meanings:

TYPE: MESH_REQ_PAYLOAD, a pre-defined unique type value.

LENGTH: Length of this element starting from FLAGS.

FLAGS: As defined in Table 4 as shown below.

QOS_CAPABILITIES: Same as defined in MESHQOSIE of FIG. 20, and the description of its parameters, and copied from MESHQOSIE of MESH_ASSOC_REQ of the supplicant mesh AP).

SUPP_MAC: MAC address of the child mesh AP being authenticated.

MSNIE: the Mesh Security Network information element (IE) as shown in FIG. 17 and the above description of parameters of MSNIE.

RSNIE: The Robust Security Network (RSN) information element, same as defined in FIG. 18 and the above description of its parameters, and also in the 802.11i standard, and copied from RSNIE of MESH_ASSOC_REQ of the supplicant mesh AP.

TABLE 4

MESH_REQ_PAYLOAD Flag Definitions

| Status Code | Meaning |
| --- | --- |
| bit0-1 | AP Role.<br>00: Unknown.<br>01: Parent Only, e.g. root AP.<br>10: Parent and Child, e.g. parent mesh AP.<br>11: Child Only, e.g. child mesh AP with no child |
| Bit2-7 | Reserved |

LWAPP_MESH_RSP: FIG. 26 shows a frame/frame part denoted LWAPP_MESH_RSP, where parameters have the following meanings:
- LWAPP_HDR: Same as LWAPP_HDR shown in FIG. 23, and defined the published LWAPP specification.
- LWAPP_CNTRL_HDR: Same as shown in FIG. 24 and the published LWAPP specification.
- MSG_TYPE should be set to MSG_MESH_RESPONSE, a pre-defined unique type value.
- MESH_RSP_PAYLOAD: The payload containing status of association for the Supplicant mesh AP.

MESH_RSP_PAYLOAD: FIG. 27 shows a frame/frame part denoted MESH_RSP_PAYLOAD, where parameters have the following meanings:
- TYPE: MESH_RSP_PAYLOAD, a pre-defined unique type value.
- LENGTH: Length of this element starting from STATUS field.
- FLAGS: As defined in Table 5 as shown below ('Port Status' is set to 01).
- SUPP_MAC: MAC address of the child mesh AP being authenticated, same as MESH_REQ_PAYLOAD shown in FIG. 25, and the description of the parameters thereof.

TABLE 5

MESH_XXX_PAYLOAD Flag Definitions

| Status Code | Meaning |
| --- | --- |
| bit0-1 | Port Status.<br>00: Allow no traffic.<br>01: Allow IEEE 802.11 data/EAP frames only.<br>10: Allow IEEE 802.11 LWAPP frames only.<br>11: Allow all traffic |
| Bit2-7 | Reserved |

LWAPP_MESH_KEY: FIG. 28 shows a frame/frame part denoted LWAPP_MESH_KEY, where parameters have the following meanings:
- LWAPP_HDR: Same as shown in FIG. 23 and the published LWAPP specification.
- LWAPP_CNTRL_HDR: Same as shown in FIG. 24 and the published LWAPP specification.
- MSG_TYPE should be set to MSG_MESH_KEY, a pre-defined unique type value.
- MESH_KEY_PAYLOAD: The payload containing the key (PTK; pairwise transient key) for a parent mesh AP-child mesh AP session.

MESH_KEY_PAYLOAD: FIG. 29 shows a frame/frame part denoted MESH_KEY_PAYLOAD, where parameters have the following meanings:
- TYPE: MESH_KEY_PAYLOAD, a pre-defined unique type value.
- LENGTH: Length of this element starting from FLAGS field.
- FLAGS: As defined in Table 5 above for MESH_RSP_PAYLOAD of FIG. 27, with 'Port Status' is set to 10).
- RADIO_ID: An 8-bit value representing the radio.
- ASSOC_ID: A 16-bit value specifying the child mesh AP association identifier.
- SUPP_MAC: MAC address of the child mesh AP being authenticated, same as in FIG. 25 showing MESH_REQ_PAYLOAD, and the description of the parameters thereof.
- RSNIE: The Robust Security Network (RSN) information element, same as defined in FIG. 18 and the above description of its parameters, and also in the 802.11i standard.
- QOS_CAPABILITIES: Same as in MESHQOSIE shown in FIG. 20 of the information element denoted MESHQOSIE, and the above description if its parameters, and copied from MESHQOSIE of LWAPP_MESH_REQ for the supplicant MAC.
- PTK: A 32 octet key the parent mesh AP needs to use when encrypting traffic to or decrypting traffic from the child mesh AP.
- PTK_LIFETIME: The validity period of the PTK.
- RCV_SEQ_CTR: 64-bit sequence counter.
- XMT_SEQ_CTR: 64-bit sequence counter.

LWAPP_DISCOVERY_REQ: FIG. 30 shows a frame/frame part denoted LWAPP_DISCOVERY_REQ, where parameters have the following meanings:
- LWAPP_HDR: Same as shown in FIG. 23 and the published LWAPP specification.
- LWAPP_CNTRL_HDR: Same as shown in FIG. 24 and the published LWAPP specification.
- DISCOVERY_ELEMENTS: As defined in Section 5.1 of the above-mentioned LWAPP specification "draft-ohara-capwap-lwapp-03.txt."
- MESH_DISC_PAYLOAD: Mesh capabilities, version, etc.

MESH_DISC_PAYLOAD: FIG. 31 shows a frame/frame part denoted MESH_DISC_PAYLOAD, where parameters have the following meanings:
- TYPE: MESH_DISC_PAYLOAD, a pre-defined unique type value.
- LENGTH: Length of this element starting from CAPABILITIES field.
- CAPABILITIES: As defined in Table 6 below. Note a bit is included to provide an indication of roam support.

TABLE 6

MESH_DISC_PAYLOAD Capabilities Definitions

| Status Code | Meaning |
| --- | --- |
| bit0 | Mesh Support |
| bit1 | New Security Support |
| bit2 | TG-r Roaming Support |
| bit3 | Backhaul QoS Support |
| bit4-7 | Reserved |

There is also a standard LWAPP_JOIN_REQ join request frame, and there is no need to include the PMK/bridge master key, e.g., AuthStringPayload in the Join request frame. There is no other element added to this standard frame.

LWAPP_JOIN_RSP: FIG. 32 shows a frame/frame part denoted LWAPP_JOIN_RSP, where parameters have the following meanings:
- LWAPP_HDR: Same as shown in FIG. 23 and the published LWAPP specification.

LWAPP_CNTRL_HDR: Same as shown in FIG. 24 and the published LWAPP specification.

JOIN_RSP_ELEMENTS: As defined in Section 6.2 of the above-mentioned LWAPP specification "draft-ohara-capwap-lwapp-03.txt."

MESH_JOIN_PAYLOAD: Key material for supporting fast roaming.

MESH_JOIN_PAYLOAD: FIG. 33 shows a frame/frame part denoted MESH_JOIN_PAYLOAD. This payload must be encrypted with LWAPP key. In FIG. 33, parameters have the following meanings:

TYPE: MESH_JOIN_PAYLOAD, a pre-defined unique type value.

LENGTH: Length of this element starting from LWAPP key (LKEY) field.

LKEY: 32 byte LWAPP key as defined by the LWAPP spec.

LKEY_LIFETIME: The validity period of the LKEY, this should be a 4 byte field specifying the number of minutes the LKEY is valid. "0" should be valid forever.

RKEY: 256 byte roam key used to allow an effective session resumption or re-establishment or update of a mesh security session without requiring a full EAP authentication.

RKEYID: A pre-assigned identifier for the RKEY key.

RKEY_LIFETIME:: (4-byte field denoting the number of minutes with "0" meaning forever). The validity period of the RKEY.

Re-Authentication Frames

One aspect of the invention is the use of re-authentication frames to achieve rapid re-authentication. In the embodiment described herein, re-authentication frames are not the same as the first-time authentication frames. One aspect of the invention is to leverage that there is a soon-to-be established IEEE 802.11 standard mechanism for fast roaming, the IEEE 802.11r proposed standard, referred to herein as TG-r, the inventors decided to follow the TG-r frame formats as much as possible. Of course, those in the art will recognize that other frame formats may alternately be used to convey the information. Furthermore, as already stated, the present invention is not restricted to IEEE 802.11-based wireless mesh networks.

FIGS. 34-43 and the following explanations provide a description of the frames or frame parts used in one embodiment for some re-authentication aspects of the present invention.

TGR_AUTH_REQ: FIG. 34 shows a Mesh TG-r authentication request frame or frame part denoted TGR_AUTH_REQ, where parameters have the following meanings:

ADJ_HDR: Same as in FIG. 14 of NEIGH_UPD and the above description of parameters of NEIGH_UPD, with Frame-type set to ADJ_TGR_REQ, a pre-defined unique type value, and Version to 2.0.

SNONCE: A random number generated by the Supplicant mesh AP to enable the peer to generate a key based on the SNONCE.

MDID: Mesh Domain ID (the replacement for "bridge-groupname"), a string up to 12 bytes in size. Same as defined in MSNIE shown in FIG. 17, the Mesh Security Network information element.

RKEYID (or PMKR0Name in some embodiments): A pre-assigned identifier for the RKEY key, same as in MESH_ JOIN_PAYLOAD of FIG. 33. In another embodiment, this is PMKR0Name, the name for PMK-R0.

TGR_AUTH_RSP: FIG. 35 shows a Mesh TG-r authentication response frame or frame part denoted TGR_AUTH_RSP, where parameters have the following meanings:

ADJ_HDR: Same as FIG. 14 and the above description of parameters of NEIGH_UPD, with Frame-type set to ADJ_TGR_RSP, a pre-defined unique type value, and Version to 2.0.

ANONCE: A random number generated by the Authenticator mesh AP.

SNONCE: must be the same SNONCE value as the Mesh TG-r authentication request frame TGR_AUTH_REQ.

PMKR0Name (or RKEYID in another embodiment): must be the same PMKR0Name value (or RKEYID, depending on the embodiment) as the Mesh TG-r authentication request frame TGR_AUTH_REQ.

LWAPP_MESH_RREQ: FIG. 36 shows a frame or frame part denoted LWAPP_MESH_RREQ. In one embodiment, this frame is encrypted using the HMAC-SHA1 formula described above, and copied in the length field of the LWAPP_CNTRL_HDR. In FIG. 36, parameters have the following meanings:

LWAPP_HDR: Same as described in FIG. 23 and the published LWAPP specification.

LWAPP_CNTRL_HDR: Same as described in FIG. 24 and the published LWAPP specification.

MSG_TYPE should be set to MSG_MESH_RREQUEST, a pre-defined unique type value.

MESH_RREQ_PAYLOAD: The payload containing TGR fast roaming context.

MESH_RREQ_PAYLOAD: FIG. 37 shows a frame or frame part denoted MESH_RREQ_PAYLOAD, where parameters have the following meanings:

TYPE: MESH_RREQ_PAYLOAD, a pre-defined unique type value.

LENGTH: Length of this element starting from ANONCE field.

SNONCE: The Supplicant mesh AP NONCE, same as in FIG. 34 describing TGR_AUTH_REQ.

ANONCE: The Authenticator mesh AP NONCE. See FIG. 35 describing TGR_AUTH_RSP.

MDID: Mesh Domain ID (the replacement for "bridge-groupname"), a string up to 12 bytes in size. Same as defined in FIG. 17 showing MSNIE, the Mesh Security Network information element.

RKEYID (or PMKR0Name in some embodiments): A pre-assigned identifier for the RKEY key. In another embodiment, this is PMKR0Name, the name for PMK-R0.

MESH_RE-ASSOC_REQ: FIG. 38 shows a mesh re-association request frame or frame part denoted MESH_RE-ASSOC_REQ, where parameters have the following meanings:

ADJ_HDR: Same as FIG. 14 and the above description of parameters of NEIGH_UPD, with Frame-type set to ADJ_RE-ASSOC_REQ, a pre-defined unique type value, and Version to 2.0.

SNONCE: SNONCE: The Supplicant mesh AP NONCE, same as in FIG. 34 describing TGR_AUTH_REQ. This must be the same as the SNONCE in the TG-r authentication request frame.

ANONCE: The Authenticator mesh AP NONCE. See FIG. 35 describing TGR_AUTH_RSP. This must be the same as the SNONCE in the TG-r authentication response frame.

MDID: Mesh Domain ID (the replacement for "bridge-groupname"), a string up to 12 bytes in size. Same as defined in FIG. 17 showing MSNIE, the Mesh Security Network information element. This must be the same as the SNONCE in the TG-r authentication request frame.

RKEYID or PMKR1Name: A pre-assigned identifier for the RKEY key or in another embodiment, the assigned name of the PMK-R1 key.

MIC: Message integrity check hash function value for this FRAME. It is computed over the entire payload using the RKEY as defined in the key hierarchy section herein above. The MIC field value contains the following, where the MIC field is zeroe'd in the Mesh re-association request frame during the MIC computation:
MIC=HMAC-SHA256(RKEY, MESH_RE-ASSOC_REQ).

MESH_RE-ASSOC_RSP: FIG. 39 shows a frame or frame part denoted MESH_RE-ASSOC_RSP, where parameters have the following meanings:

ADJ_HDR: Same as FIG. 14 and the above description of parameters of NEIGH_UPD, with Frame-type set to ADJ_RE-ASSOC_RSP, a pre-defined type number, and Version to 2.0.

ANONCE: The Authenticator mesh AP NONCE. See FIG. 35 describing TGR_AUTH_RSP.

MDID: Mesh Domain ID (the replacement for "bridge-groupname"), a string up to 12 bytes in size. Same as defined in FIG. 17 showing MSNIE, the Mesh Security Network information element.

RKEYID: A pre-assigned identifier for the RKEY key, same as defined in FIG. 33 showing MESH_JOIN_PAYLOAD.

MIC: Message integrity check hash function value for this frame, computed over the entire payload using the RKEY as defined above in the key hierarchy section. The MIC field value contains the following, where the MIC field is zeroe'd in the Mesh re-association response frame during the MIC computation:
MIC=HMAC-SHA256(RKEY, MESH_RE-ASSOC_RSP)

LWAPP_JOIN_ROAM_REQ: FIG. 40 shows a frame or frame part denoted LWAPP_JOIN_ROAM_REQ. This frame is encrypted using the HMAC-SHA1 formula as defined in the description of FIG. 37 and copied in the length field of the LWAPP_CNTRL_HDR. The parameters if FIG. 49 have the following meanings:

LWAPP_HDR: Same as described in FIG. 23 and the published LWAPP specification.

LWAPP_CNTRL_HDR: Same as described in FIG. 24 and the published LWAPP specification.

JOIN_REQ_ELEMENTS: As defined in Section 6.1 of the above-mentioned LWAPP specification "draft-ohara-capwap-lwapp-03.txt" as in first-time join.

MESH_RREQ_PAYLOAD: As shown in FIG. 37 describing MESH_RREQ_PAYLOAD; the TG-r context information.

LWAPP_JOIN_ROAM_RSP: FIG. 41 shows a frame or frame part denoted LWAPP_JOIN_ROAM_RSP. This frame is encrypted with using the HMAC-SHA1 formula used in MESH_RREQ_PAYLOAD and copied in the length field of the LWAPP_CNTRL_HDR. The parameters of FIG. 41 have the following meanings:

LWAPP_HDR: Same as described in FIG. 23 and the published LWAPP specification.

LWAPP_CNTRL_HDR: Same as described in FIG. 24 and the published LWAPP specification.

JOIN_RSP_ELEMENTS: As defined in Section 6.2 of the above-mentioned LWAPP specification "draft-ohara-capwap-lwapp-03.txt" as in first-time join.

MESH_RREQ_PAYLOAD: Same as shown in FIG. 37 describing MESH_RREQ_PAYLOAD; the TG-r context information, with, in this case, MIC=0.

MESH_RRSP_PAYLOAD: Keying material for the roamed session of the mesh AP.

MESH_RRSP_PAYLOAD: FIG. 42 shows a frame or frame part denoted MESH_RRSP_PAYLOAD. This payload must be encrypted with LWAPP key. Parameters of FIG. 42 have the following meanings:

TYPE: MESH_RRSP_PAYLOAD, a predefined type number.

LENGTH: Length of this element starting from LKEY2 field.

LKEY2: A pre-defined key.

LKEY2_LIFETIME: The validity period of the LKEY.

RKEY: The roam key used to allow an effective session resumption or re-establishment or update of a mesh security session without requiring a full EAP authentication.

RKEYID: A pre-assigned identifier for the RKEY key, same as defined in FIG. 33 showing MESH_JOIN_PAYLOAD.

RKEY_LIFETIME: The validity period of the RKEY.

Group Key Support

The group keys should be derived as part the IEEE 802.11i 4-way handshake and installed accordingly. There is no new message or message formats are necessary. Details of the handshake appears in the published IEEE 802.11i standard (IEEE-Std-802.11i-2004), e.g., Section 5.9.2.1.

Platform Specifications

This section describes in detail, how each of the platforms participating in a Mesh Backhaul Security Protocol (MSN) that uses the Mesh Backhaul Security Protocol.

Mesh Security Context

The Authenticator needs to save the following security context on a per MAC address basis:

1) PMK. In the case TG-r-roaming is enabled, the PMK-R0, R0KH-ID, PMK-R1 and R1KH-ID also are stored.
2) PMK-lifetime. In the case TG-r-roaming is enabled, these are PMK-R0 and PMK-R1 lifetimes.
3) PTK.
4) PTK-lifetime.
5) ANONCE.
6) SNONCE.
7) LWAPP-Session-ID.
8) LWAPP-Session-ID-Lifetime.
9) RKey.
10) Rkey-ID.
11) LWAPP-Key.
12) LWAPP-Key-Lifetime.
13) Parent-MAC.
14) Network access server ID.
15) MDID.

The Authenticator (the Controller) stores some of these, e.g. LWAPP related elements already in the AP association table. The AP association table should be augmented to include the security context for each mesh AP and explicitly flag those as mesh APs. The Supplicant (mesh AP) may or may not need all of these elements and should be decided upon implementation specification.

Supplicant

Supplicant, as defined in IEEE-Std 802.11i-2004, is the same entity of a child mesh AP or child mesh AP in a wireless mesh network. This specification assumes that a child mesh AP already has an IEEE 802.1x Supplicant stack and IEEE 802.11i Client stack in place, e.g., as part of the software in the mesh AP. Hence, it only specifies the mesh-related aspects of the security protocol. As root AP and mesh AP are the two distinct types of nodes participating in a MSN, they are distinguished in this section along with processing that are common to both.

Mesh AP Only: NEIGH_UPD Processing
    child mesh AP determines which parent mesh AP to join based on the neighbor update packet info: the MDID and network access server ID and RSNIE capabilities.
    It is implied that child mesh AP can be configured with some profile or cache of who it should join from a mobility and security perspective.
    As a factory default, the RSNIE profile should be set to EAP-FAST and AES-CCMP, using device certificates.
    There should be a factory default mobility group.
    The network access server ID is provided after LWAPP join and thus need not have a factory default.
    It is presumed that there is storage to maintain the factory defaults and profile for each neighbor or potential parent. There should be a minimum set of storage and a maximum bound for the storage allocation. The management can be done as a FIFO.

Parent Mesh AP: NEIGH_UPD Generation
    Equivalent to IEEE 802.11 beacon, advertises capabilities, in this context: security capabilities.
    A Parent mesh AP is expected to be configured with its mobility group/domain and network access server identifier (e.g. Controller's authenticator identity).
    network access server ID and MDID are begotten once the AP has LWAPP joined with the Controller.
    AP can begin to send neighbor updates after it has LWAPP joined.

Authenticator (Controller)
Authentication Database
    In one embodiment, the authenticator maintains an authentication database, which is an extended version of the MAC filter database of prior-art authenticators. In one embodiment, the following new elements are added to each element in the MAC filter database:
    1) Role of the AP.
    2) ACLs/VLANs per role.
    3) Other policies pushed down by the authentication server.

Figure 5:
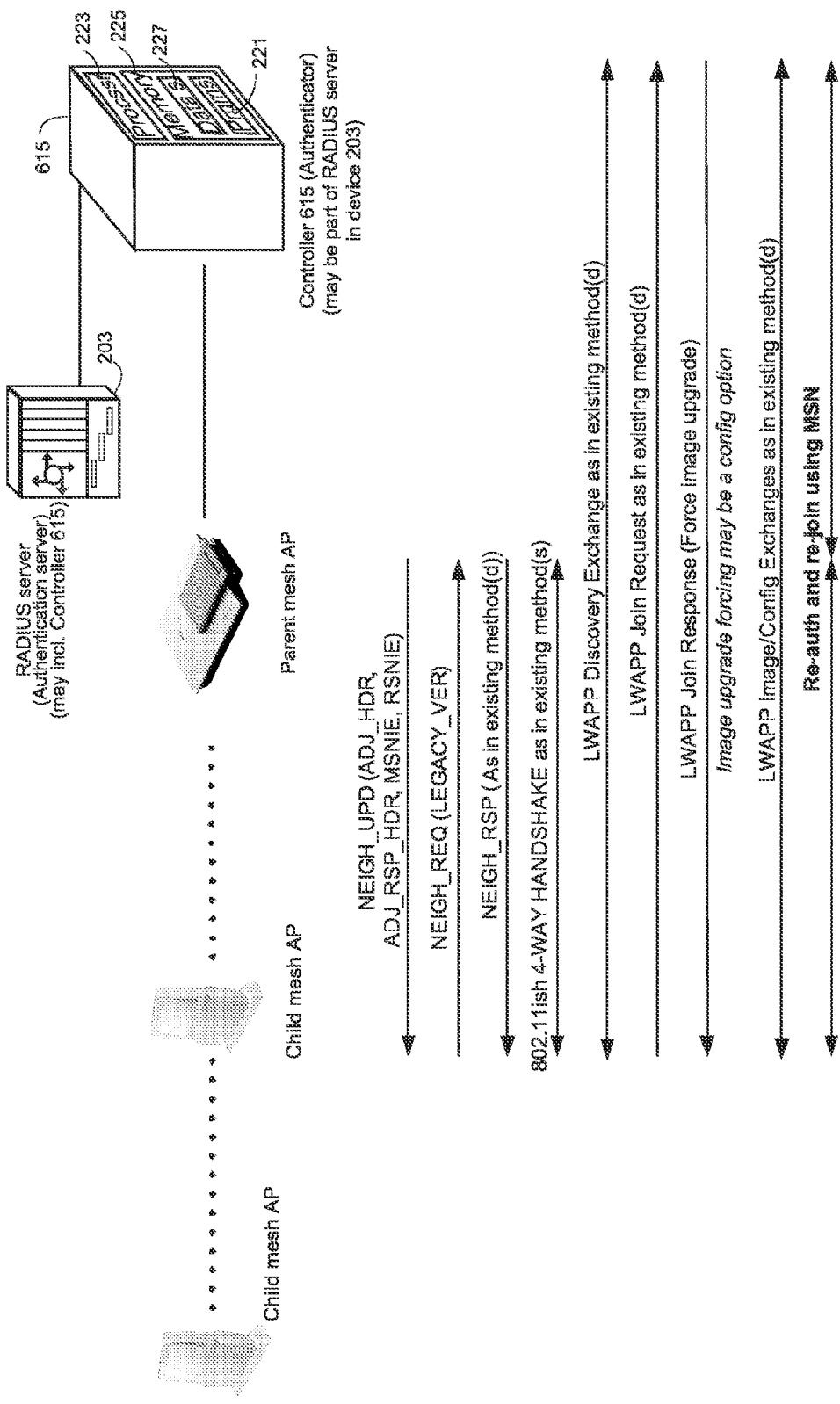
FIG. 5 shows by example how support for legacy mechanisms is provided for in the Mesh Security methods presented herein.

Legacy Support
    Legacy mesh APs are supported quite easily in an network that supports the inventive the aspects described herein, and an LWAPP-integrated migration path to the new inventive methods is presented to the legacy mesh APs. Legacy mesh APs are allowed to form the initial association and join a Controller using current security mechanism. The Controller then forces (as a configuration option) the mesh AP to upgrade software in order to be able to support the new security scheme. An example of this process is illustrated in FIG. 5. By "as today" is meant as in the present-day security mechanism.

General
    The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a computer-readable storage medium that is configured with code segments, (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute a computer-readable storage medium configured with instructions that can be executed.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspects. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of wireless Dbridge. Thus, as will be appreciated by those skilled in the art, embodiments of the present invention may be embodied as a method, an apparatus such as a special purpose apparatus, an apparatus such as a data processing system, or a computer-readable storage medium, e.g., a computer program product. The computer-readable storage medium is configured with one or more code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of computer-readable storage medium, e.g., a computer program product that is configured with program code segments.

The software may further be transmitted or received over a network via the network interface device. While the computer-readable storage medium is shown in an exemplary embodiment to be a single medium, the term "medium" should be taken to include a single medium or multiple media, e.g., a centralized or distributed database, and/or associated caches and servers that store the one or more sets of instructions. The term "computer-readable storage medium" shall also be taken to include any medium that is capable of storing or encoding a set of instructions for execution by a machine and that cause the machine to perform any one or more of the methodologies of the present invention. A computer-readable storage medium may take many forms, including but not limited to, non-volatile media and volatile media. Non-volatile media includes, for example, optical, magnetic disks, and magneto-optical disks. Volatile media includes dynamic memory, such as main memory. For example, the term "computer-readable storage medium" shall accordingly be taken to included, but not be limited to, one or more of solid-state memories, optical media, and magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should be appreciated that although the invention has been described in the context of the IEEE 802.11 standard, the invention is not limited to such contexts and may be utilized in various wireless network applications and systems, for example in a system that uses packets other than IEEE 802.11 packets, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, WiMAX, and other wireless standards. Furthermore, while the invention has been presented with light access point connectable to a Controller, the invention is also implementable in other mesh wireless networks that require secure communication with a central Controller.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a first mesh access point (AP) comprising:
securing a layer-2 link between the first mesh AP and a second mesh AP, the second mesh AP being a mesh point of a mesh network of mesh points, each mesh point in the mesh network having a secure tunnel to a controller, wherein the controller centrally controls the mesh network, including controlling functions other than authentication, authorization and accounting performed by a RADIUS server, the functions including access control, mobility and radio management of mesh points in the mesh network that have access point capability, such that mesh points of the mesh network that have access point capability are lightweight access points under control of the controller, and such that wireless clients associated with a mesh point that has access point capability and that is in the mesh network can securely communicate with the controller;

undergoing a join exchange with the controller to establish a secure tunnel with the controller and to join the mesh network, wherein the securing the layer-2 link includes:
- carrying out an association exchange with the controller via the second mesh AP;
- undergoing a backend authentication with the controller as authenticator resulting in a pairwise master key available at the first mesh AP and the authenticator, such that a secure tunnel is established between the first mesh AP and the controller; and
- undergoing a 4-way handshake with the first mesh AP as supplicant and the controller as authenticator using the pairwise master key to determine a pairwise transient key to use between the first mesh AP and the second mesh AP, the method further comprising:
- caching a roam key and an identifier therefor, including mesh domain identification information, such that a secure link can be rapidly established between the first mesh AP and a third mesh AP that has a secure tunnel with the controller and that sends mesh beacon frames that include an indication that the third mesh AP supports fast roaming of links between a child mesh AP and the third mesh AP as a parent mesh AP, the rapidly establishing including using a key hierarchy to determine a new pairwise transient key for use between the first mesh AP and the third mesh AP without the first mesh AP having to undergo a backend authentication with the controller.

2. A method as recited in claim 1, wherein the first mesh AP has access point functionality and can have associated wireless clients, wherein no wireless client data frames of any wireless clients of the first mesh AP are passed through to the controller until the secure tunnel is established between the controller and the first mesh AP, the method further comprising, after the secure tunnel is established between the controller and the first mesh AP, passing all wireless client data frames from the first mesh AP to the controller.

3. A method as recited in claim 1, wherein the securing a layer-2 link between the first mesh AP and a second mesh AP is a result of the first mesh AP's receiving a mesh beacon frame sent by the second mesh AP advertising the second mesh AP's capabilities as a parent, and ascertaining based on information related to the receiving of the mesh beacon frame, that the first mesh AP is to attempt joining the mesh network via the second mesh AP.

4. A method as recited in claim 1, further comprising:
after the secure tunnel is formed between the first mesh AP and the controller, caching: the session identifier for the secure tunnel with the controller, the key for the secure tunnel, the roam key and the identity of the controller, such that a secure tunnel with the controller can be rapidly re-established via a third mesh AP that has a secure tunnel with the controller, the re-establishing not requiring a complete discover exchange between the first mesh AP and the controller via the third mesh AP, the re-establishing further not requiring a complete join exchange between the first mesh AP and the controller via the third mesh AP.

5. A method as recited in claim 1, wherein the backend authentication is and Extensible Authentication Protocol IEEE 802.1x authentication and the second 4-way handshake is an IEEE 802.11i 4-way handshake initiated by the first mesh AP.

6. A method as recited in claim 1, wherein:
the key hierarchy that enables deriving other pairwise transient keys from the master key is determined during the backend authentication;
the using of the key hierarchy for the rapidly establishing includes using cached information to derive a pairwise transient key to use for the link via the third mesh AP.

7. A method as recited in claim 1, further comprising:
wherein the caching is after the secure tunnel is formed between the first mesh AP and the controller, and includes caching the session identifier for the secure tunnel with the controller, the key for the secure tunnel, a roam key, and the identity of the controller such that the secure tunnel with the controller can be rapidly re-established via the third mesh AP that has the secure tunnel with the controller, the re-establishing not requiring a complete discover exchange between the first mesh AP and the controller via the third mesh AP, the re-establishing further not requiring a complete join exchange between the first mesh AP and the controller via the third mesh AP.

8. A method in a controller comprising:
controlling a mesh network comprising a root mesh access point (AP) and one or more other mesh APs, including controlling functions other than authentication, authorization and accounting performed by a RADIUS server, the functions including access control, mobility and radio management of mesh points in the mesh network that have access point capability, wherein mesh points of the mesh network that have access point capability are lightweight access points under control of the controller having a secure tunnel with the controller, and such that wireless clients associated with a mesh point that has access point capability and that is in the mesh network can securely communicate with the controller;
maintaining a secure tunnel with a first mesh AP;
carrying out an association exchange with the s second mesh AP via the first mesh AP;
undergoing a backend authentication as authenticator, with the second mesh AP as supplicant, the authentication resulting in a pairwise master key available at the second mesh AP and the controller;
undergoing a 4-way handshake as authenticator with the second mesh AP as supplicant using the pairwise master key to determine a pairwise transient key to use between the second mesh AP and the first mesh AP, such that a secure a layer-2 link between the second mesh AP and a first mesh AP is established for the first mesh AP to be a parent mesh AP to the second mesh AP in the mesh network;
undergoing a join exchange with the second mesh AP to establish a secure tunnel between the second mesh AP and the controller such that the second mesh AP joins the mesh network; and
caching a roam key and an identifier therefor, including mesh domain identification information, such that a secure link can be rapidly established between the second mesh AP and a third mesh AP that has a secure tunnel with the controller and that sends mesh beacon frames that include an indication that the third mesh AP supports fast roaming of links between a child mesh AP and the third mesh AP as a parent mesh AP, the rapidly establishing including using a key hierarchy to determine a new pairwise transient key for use between the second mesh AP and the third mesh AP without the second mesh AP having to undergo a backend authentication with the controller.

9. A method as recited in claim 8, wherein the second mesh AP has access point functionality and can have associated wireless clients, wherein no wireless client data frames of any wireless clients of the second mesh AP are passed through to the controller until the secure tunnel is established between the controller and the second mesh AP, and wherein all wireless client data frames from the second mesh AP is passed to the controller after the secure tunnel is established between the controller and the second mesh AP.

10. A method as recited in claim 8, further comprising:
after the secure tunnel is formed between the second mesh AP and the controller, caching: the session identifier for the secure tunnel with the controller, the key for the secure tunnel, the roam key and the identity of the controller, such that a secure tunnel with the controller can be rapidly re-established via a third mesh AP that has a secure tunnel with the controller, the re-establishing not requiring a complete discover exchange between the second mesh AP and the controller via the third mesh AP, the re-establishing further not requiring a complete join exchange between the second mesh AP and the controller via the third mesh AP.

11. A method as recited in claim 8, wherein the backend authentication authentication is an Extensible Authentication Protocol IEEE 802.1x authentication and the first 4-way handshake is an IEEE 802.11i 4-way handshake initiated by the second mesh AP.

12. A method as recited in claim 8, wherein:
the key hierarchy that enables deriving other pairwise transient keys from the master key is determined during the backend authentication;
the using of the key hierarchy for the rapidly establishing includes using cached information to derive a pairwise transient key to use for the link via the third mesh AP.

13. A method as recited in claim 8, further comprising:
wherein the caching is after the secure tunnel is formed between the second mesh AP and the controller, and includes caching the session identifier for the secure tunnel with the controller, the key for the secure tunnel, a roam key, and the identity of the controller such that the secure tunnel with the controller can be rapidly re-established via the third mesh AP that has the secure tunnel with the controller, the re-establishing not requiring a complete discover exchange between the second mesh AP and the controller via the third mesh AP, the re-establishing further not requiring a complete join exchange between the second mesh AP and the controller via the third mesh AP.

14. A controller comprising:
one or more processors, and
a storage subsystem,
wherein the storage subsystem is configured with instructions that when executed, cause:
controlling a mesh network comprising a root mesh access point (AP) and one or more other mesh APs, including controlling functions other than authentication, authorization and accounting performed by a RADIUS server, the functions including access control, mobility and radio management of mesh points in the mesh network that have access point capability, wherein mesh points of the mesh network that have access point capability are lightweight access points under control of the controller having a secure tunnel with the controller, and such that wireless clients associated with a mesh point that has access point capability and that is in the mesh network can securely communicate with the controller;
maintaining a secure tunnel with a first mesh AP;
carrying out an association exchange with the s second mesh AP via the first mesh AP;
undergoing a backend authentication with the controller as authenticator, with the second mesh AP as supplicant, the authentication resulting in a pairwise master key available at the second mesh AP and the controller;
storing the pairwise master key in the storage subsystem;
the controller undergoing a 4-way handshake as authenticator with the second mesh AP as supplicant using the pairwise master key to determine a pairwise transient key to use between the second mesh AP and the first mesh AP, such that a secure a layer-2 link between the second mesh AP and a first mesh AP is established for the first mesh AP to be a parent mesh AP to the second mesh AP in the mesh network;
undergoing a join exchange with the second mesh AP to establish a secure tunnel between the second mesh AP and the controller such that the second mesh AP joins the mesh network; and
storing in the storage subsystem a roam key and an identifier therefor, including mesh domain identification information, such that a secure link can be rapidly established between the second mesh AP and a third mesh AP that has a secure tunnel with the controller and that sends mesh beacon frames that include an indication that the third mesh AP supports fast roaming of links between a child mesh AP and the third mesh AP as a parent mesh AP, the rapidly establishing including using a key hierarchy to determine a new pairwise transient key for use between the second mesh AP and the third mesh AP without the second mesh AP having to undergo a backend authentication with the controller.

15. A controller as recited in claim 14, wherein the second mesh AP has access point functionality and can have associated wireless clients, wherein no wireless client data frames of any wireless clients of the second mesh AP are passed through to the controller until the secure tunnel is established between the controller and the second mesh AP, and wherein all wireless client data frames from the second mesh AP is passed to the controller after the secure tunnel is established between the controller and the second mesh AP.

16. A controller as recited in claim 14, further comprising:
storing in the storage subsystem and after the secure tunnel is formed between the second mesh AP and the controller, the session identifier for the secure tunnel with the controller, the key for the secure tunnel, the roam key and the identity of the controller, such that a secure tunnel with the controller can be rapidly re-established via a third mesh AP that has a secure tunnel with the controller, the re-establishing not requiring a complete discover exchange between the second mesh AP and the controller via the third mesh AP, the re-establishing further not requiring a complete join exchange between the second mesh AP and the controller via the third mesh AP.

17. A controller as recited in claim 14, wherein:
the key hierarchy that enables deriving other pairwise transient keys from the master key is determined during the backend authentication; and
the using of the key hierarchy for the rapidly establishing includes using cached information to derive a pairwise transient key to use for the link via the third mesh AP.

18. A method in a first mesh point, including:
the first mesh point associating with a first parent mesh point of a wireless mesh network, the first parent mesh point being coupled to a Controller acting as an authenticator, the Controller to centrally control the mesh points of the wireless mesh network, including acting as authenticator for authentication of mesh points and including controlling control functions other than authentication, authorization and accounting performed by a RADIUS server, said control functions including controlling access control, mobility and radio management of mesh points of the mesh network that have access point capability, wherein mesh points of the mesh network that have access point capability are lightweight access points under control of the Controller having a secure tunnel with the Controller, and such that wireless clients associated with a mesh point that has access point capability and that is in the mesh network can securely communicate with the Controller, the controlling using control frames conforming to a protocol for controlling access point functionality of mesh points in the mesh network;
the first mesh point undergoing a certificate-based backend mutual authentication with the Controller as authenticator via the first parent mesh point of the mesh network, the certificate-based backend authentication resulting in a first pairwise master key;
using a hierarchy of derived keys to define how to determine derived master key keys based on the first pairwise master key that is the result of the certificate-based backend authentication; and
undergoing a 4-way handshake initiated by the first mesh point as supplicant and the Controller as authenticator using a master key derived from the certificate-based backend authentication using the hierarchy, the 4-way handshake to determine a transient key for the first mesh point to securely communicate with the first parent mesh point in the mesh network;
such that a new link between the first mesh point and a new different parent mesh point is securable by a new transient key determined according to the key hierarchy without the first mesh point needing to re-undergo a certificate-based backend authentication.

19. A method as recited in claim 18, further comprising:
the first mesh point rejoining the mesh network via a second parent mesh point, including associating with the second parent mesh point and securing the link between the first mesh point and the second parent mesh point using a new transient key determined according to the key hierarchy without the first mesh point re-undergoing a certificate-based backend authentication.

20. A method as recited in claim 19, wherein the first mesh point includes access point functionality controlled by the Controller using a protocol, and wherein the first parent mesh point and the second parent mesh point each has a secure tunnel to the controller using the protocol, the method further comprising:
once the link between the first mesh point and the first parent mesh point is secured, the first mesh point joining the Controller by forming a secure tunnel to the Controller via the first parent mesh point such that the first mesh point can function as an access point; and
once the link between the first mesh point and second parent mesh point is secured, the first mesh point re-joining the Controller by re-forming the secure tunnel to the Controller via the second parent mesh point such that the first mesh point can function as an access point.

21. A method as recited in claim 18, wherein the certificate-based backend authentication is an IEEE 802.1x Extensible Authentication Protocol authentication.

22. A method as recited in claim 21, wherein the wireless mesh network is a mesh network substantially conforming to the IEEE 802.11 standard, and wherein the 4-way handshake is substantially an IEEE 801.11i 4-way handshake, with the first mesh point initiating the 4-way handshake as supplicant.

23. A method as recited in claim 18, wherein the first mesh point includes access point functionality controlled by the Controller using a protocol, and wherein the first parent mesh point has a secure tunnel to the Controller using the protocol, the method further comprising:
once the link between the first mesh point and the first parent mesh point is secured, the first mesh point joining the Controller by forming a secure tunnel to the Controller via the first parent mesh point such that the first mesh point can function as an access point.

* * * * *